(12) United States Patent
Haug, III et al.

(10) Patent No.: US 9,324,168 B2
(45) Date of Patent: Apr. 26, 2016

(54) CONSTRAINT-BASED CORRECTION OF SHAPE POSITIONS IN A DIAGRAM

(75) Inventors: John Edward Haug, III, Redmond, WA (US); Jie Li, Bellevue, WA (US); Ramona Pousti Canan, Bellevue, WA (US); Zach Andrew Barth, Redmond, WA (US); Amit Velingkar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1263 days.

(21) Appl. No.: 12/712,194

(22) Filed: Feb. 25, 2010

(65) Prior Publication Data

US 2010/0153841 A1 Jun. 17, 2010

Related U.S. Application Data

(63) Continuation-in-part of application No. 12/024,084, filed on Jan. 31, 2008, now Pat. No. 8,489,986.

(51) Int. Cl.
*G06T 11/20* (2006.01)
*G06T 11/60* (2006.01)

(52) U.S. Cl.
CPC ............... *G06T 11/206* (2013.01); *G06T 11/60* (2013.01)

(58) Field of Classification Search
CPC .............................. G06T 11/206; G06T 11/60
USPC ........................................ 715/244, 247, 211
See application file for complete search history.

(56) References Cited

U.S. PATENT DOCUMENTS

| | | | |
|---|---|---|---|
| 4,933,865 A | 6/1990 | Yamamoto et al. | |
| 4,953,106 A * | 8/1990 | Gansner et al. | 345/440 |
| 5,437,008 A * | 7/1995 | Gay et al. | 715/205 |
| 5,588,108 A * | 12/1996 | Kumar et al. | 715/765 |
| 5,745,122 A * | 4/1998 | Gay et al. | 345/619 |
| 6,374,200 B1 | 4/2002 | Nakagawa | |
| 6,792,593 B2 | 9/2004 | Takashima et al. | |
| 7,428,724 B2 * | 9/2008 | Pike et al. | 717/105 |

(Continued)

FOREIGN PATENT DOCUMENTS

CN 1607522 A 4/2005

OTHER PUBLICATIONS

U.S. Notice of Allowance dated Mar. 13, 2013 in U.S. Appl. No. 12/024,084.

(Continued)

*Primary Examiner* — Cesar Paula
*Assistant Examiner* — Tyler J Schallhorn
(74) *Attorney, Agent, or Firm* — Julie Kane Akhter; Tom Wong; Micky Minhas

(57) ABSTRACT

Technologies are described herein for correcting the layout of shapes in a diagram, and specifically for diagrams having constraint-based layouts, such as with lists of regions and shapes directly connected without connecting lines. A request is received to correct the diagram layout. Shape layouts are predicted for each region, followed by minimal region corrections corresponding to the corrected shape layouts. Corrected layouts are provided sequentially through the lists of regions while resolving conflicts. Virtual nodes may be utilized to preserve region layouts when flipping or rotating diagrams. A connection classification and prioritization system is used to layout shapes and regions within a diagram having one or more direct connections between shapes and/or regions.

17 Claims, 22 Drawing Sheets

(56) References Cited

U.S. PATENT DOCUMENTS

| | | | |
|---|---|---|---|
| 7,555,710 B2* | 6/2009 | Kobashi et al. | 715/243 |
| 7,634,725 B2* | 12/2009 | Nishikawa | 715/243 |
| 8,332,750 B2* | 12/2012 | Banyasad | G06F 17/217 715/200 |
| 8,489,984 B1* | 7/2013 | Violet et al. | 715/243 |
| 8,717,383 B2* | 5/2014 | Coldicott | G06T 11/206 345/629 |
| 8,847,986 B2* | 9/2014 | Theophil | G06F 17/211 345/619 |
| 9,128,733 B2* | 9/2015 | Taron | G06F 9/443 |
| 2003/0222921 A1 | 12/2003 | Rummel | |
| 2006/0005158 A1 | 1/2006 | Pike et al. | |
| 2006/0136825 A1 | 6/2006 | Cory et al. | |
| 2006/0150168 A1* | 7/2006 | Mitchell et al. | 717/156 |
| 2006/0200759 A1* | 9/2006 | Agrawala | G06F 17/211 715/209 |
| 2006/0209084 A1 | 9/2006 | Wong et al. | |
| 2006/0209085 A1 | 9/2006 | Wong et al. | |
| 2006/0253796 A1 | 11/2006 | Wang et al. | |
| 2007/0089080 A1 | 4/2007 | Sakuraba | |
| 2007/0103468 A1 | 5/2007 | Saini et al. | |
| 2007/0162844 A1 | 7/2007 | Woodall et al. | |
| 2007/0168858 A1 | 7/2007 | Gerhard et al. | |
| 2007/0208996 A1 | 9/2007 | Berkner et al. | |
| 2007/0266307 A1 | 11/2007 | Panditharadhya et al. | |
| 2008/0012859 A1 | 1/2008 | Saillet et al. | |
| 2008/0068398 A1 | 3/2008 | Nickolayev et al. | |
| 2008/0282188 A1* | 11/2008 | Hays et al. | 715/788 |
| 2009/0089660 A1 | 4/2009 | Atkins et al. | |

OTHER PUBLICATIONS

U.S. Official Action dated Apr. 12, 2012 in U.S. Appl. No. 12/024,084.

"Lay Out Shapes Automatically" Visio 2007 Nov. 9, 2006, downloaded from http://office.microsoft.com/en-us/visio-help/lay-out-shapes-automatically-HP001231170.aspx, 2 pp.

U.S. Official Action dated Oct. 15, 2012 in U.S. Appl. No. 12/024,084.

Seybold, et al., "An Effective Layout Adaptation Technique for a Graphical Modeling Tool", Proceedings of the 25th International Conference on Software Engineering (ICSE'03), IEEE Computer Society 2003. pp. 2.

"ConceptDraw 7 Pro for Mac", BestShareware.net, 2007, pp. 1-4.

Korotkov, "Automatic Layout of State Diagrams", pp. 1-6.

U.S. Official Action dated Oct. 28, 2011 in U.S. Appl. No. 12/024,084.

"Tutorial: Modifying a container to support automatic layout", Aug. 11, 2005, Graphical Modeling Framework, downloaded from http://help.eclipse.org/help32/index.jsp?topic=/org.eclipse.gmf.doc/tutorials/diagram/automaticLayout.html, 4 pages.

Seybold, et al., "An Effective Layout Adaptation Technique for a Graphical Modeling Tool," May 3-10, 2003, Proceedings of the 25th International Conference on Software Engineering (ICSE'03), 2 pages.

Korotkov, "Automatic Layout of State Diagrams", retrieved Jan. 17, 2008, from http://unimod.sourceforge.net/articles/glavout.pdf, pp. 1-6.

Chinese Office Action mailed Nov. 4, 2014 for Chinese patent application No. 201110050518.2, a counterpart foreign application of U.S. Appl. No. 12/712,194, 13 pages.

Chinese Office Action mailed Jun. 11, 2015 for Chinese patent application No. 201110050518.2, a counterpart foreign application of U.S. Appl. No. 12/712,194, 15 pages.

Translated Chinese Office Action mailed Dec. 14, 2015 for Chinese patent application No. 201110050518.2, a counterpart foreign application of U.S. Appl. No. 12/712,194, 13 pages.

* cited by examiner

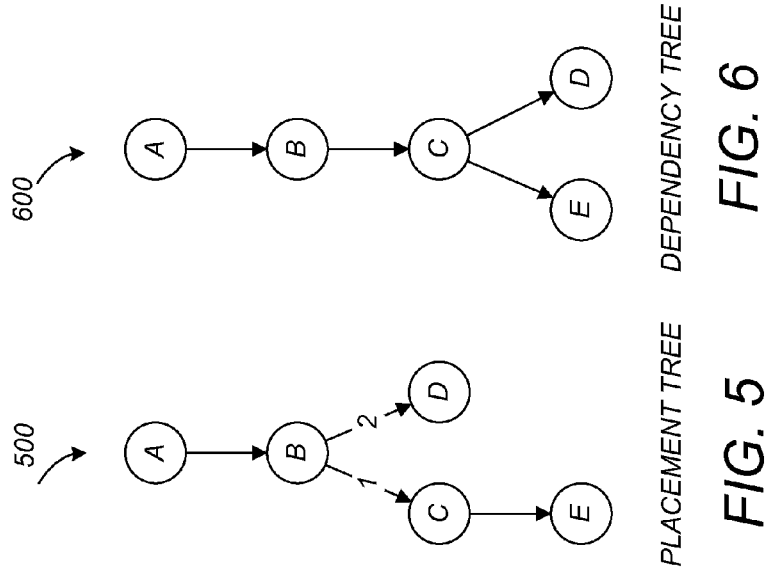
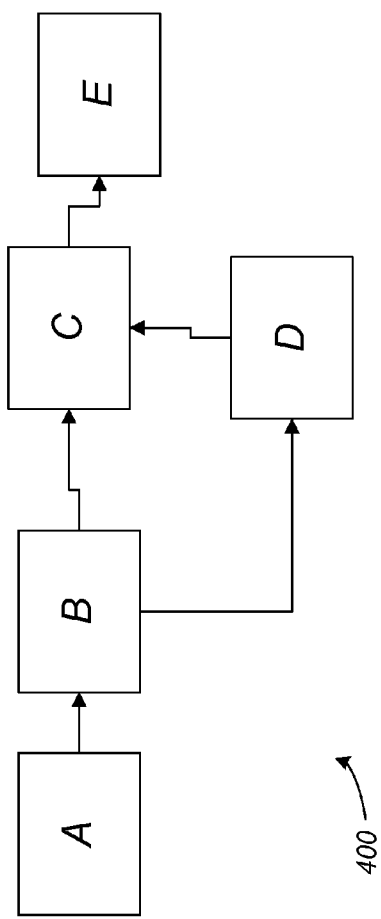
FIG. 4A
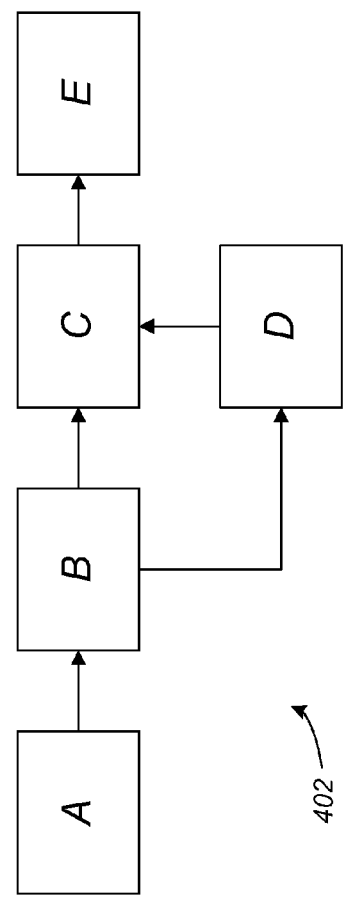
FIG. 4B
FIG. 5 PLACEMENT TREE
FIG. 6 DEPENDENCY TREE

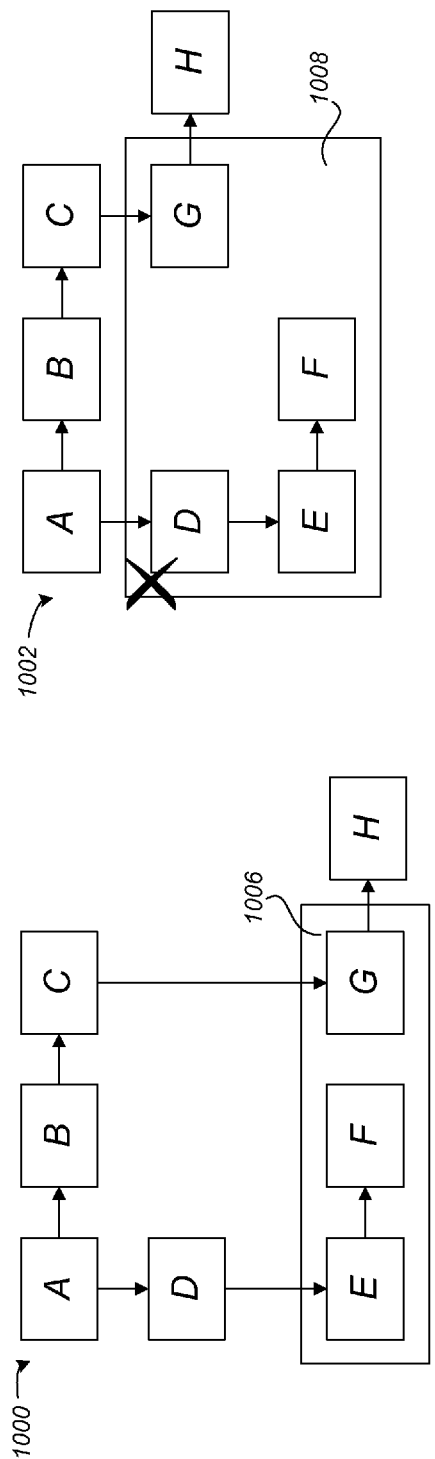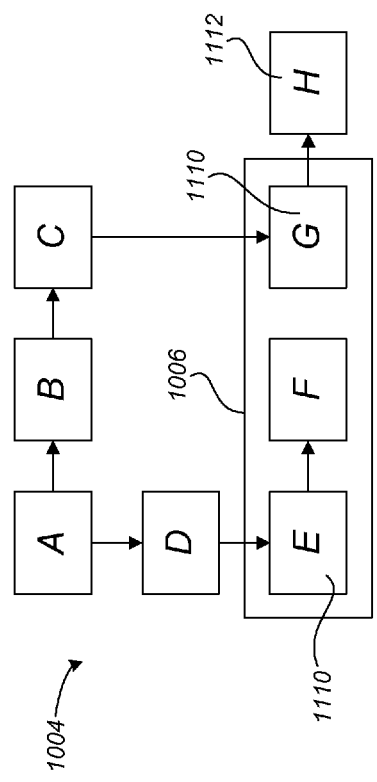
FIG. 10A
FIG. 10B
FIG. 10C

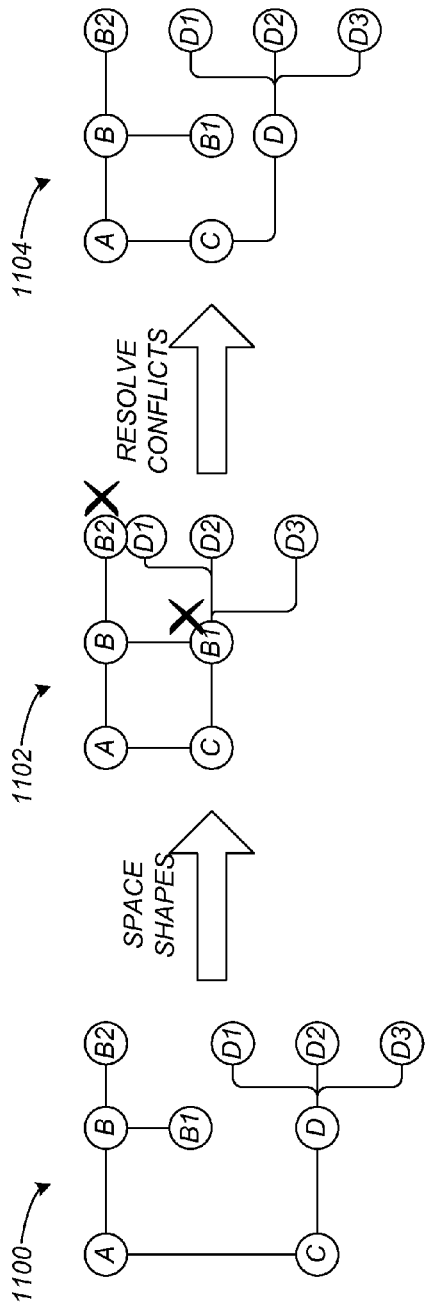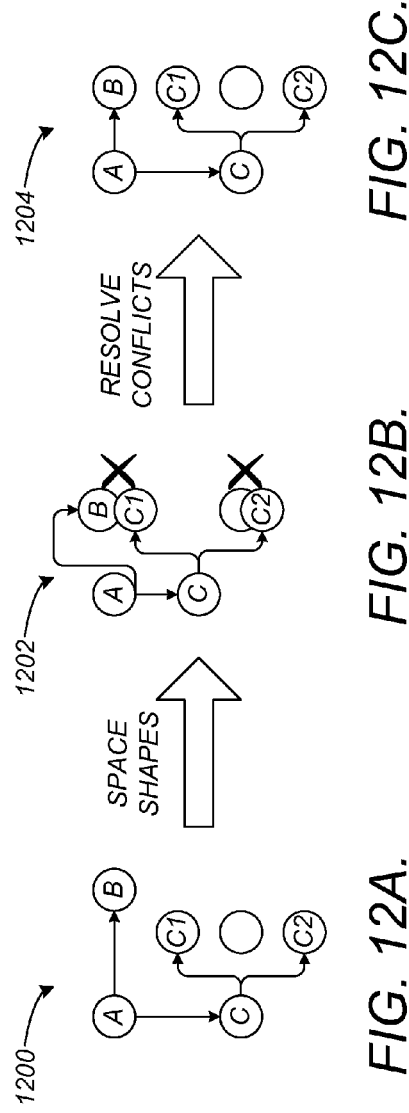
FIG. 11A. FIG. 11B. FIG. 11C.
FIG. 12A. FIG. 12B. FIG. 12C.

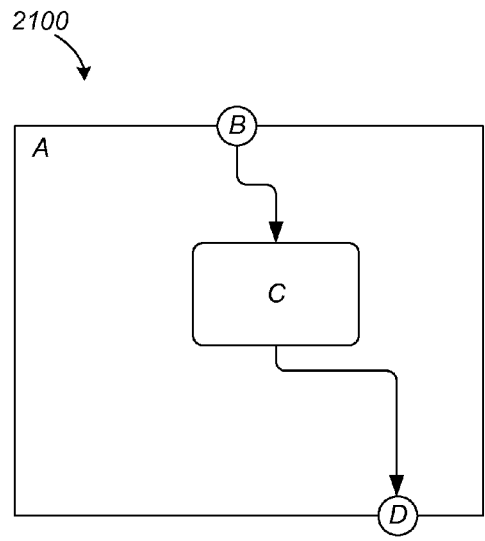
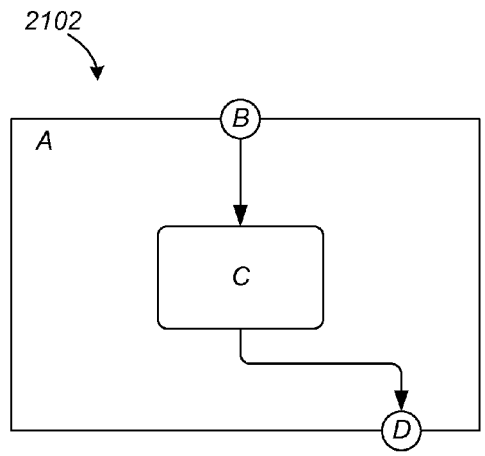
FIG. 21A.  FIG. 21B.
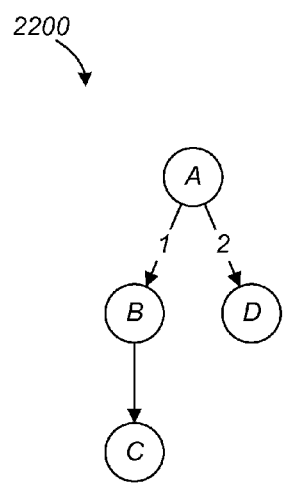
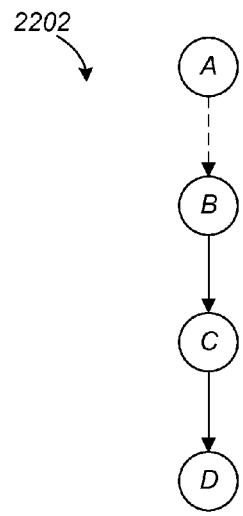
FIG. 22A.  FIG. 22B.

CONSTRAINT-BASED CORRECTION OF SHAPE POSITIONS IN A DIAGRAM

CROSS-REFERENCE TO RELATED APPLICATION

This application is a continuation-in-part of co-pending U.S. utility application entitled "Correcting Positions of Shapes in a Diagram," having Ser. No. 12/024,084, filed Jan. 31, 2008, which is entirely incorporated herein by reference.

BACKGROUND

Diagramming applications are commonly used to create flowcharts and other diagrams. When creating and editing a diagram, users often drag and drop shapes and connectors into the diagram, re-size shapes, add text, move shapes, insert shapes, flip and rotate shapes and portions of the diagram, as well as various other actions. In doing so, shapes and connectors often become misaligned and unevenly spaced apart. In an effort to create a professional and visually appealing end product, users may find it necessary to spend a significant amount of time nudging shapes and corresponding connectors around to properly align and space the shapes within the diagram.

It is with respect to these considerations and others that the disclosure made herein is presented.

SUMMARY

Technologies are described herein for making minor corrections to the positions of shapes and regions, such as containers, in a diagram in order to properly align and space the shapes and regions while maintaining the existing layout to preserve the intent of the diagram creator. In particular, through the utilization of the concepts presented herein, a user may properly align and space shapes and regions in a diagram without manual manipulation of the shapes, regions, and connectors within the diagram. Any constraints placed on the layout by the characteristics of the regions, or by the direct connection of shapes and regions, are preserved during layout correction or manipulation. After correcting a diagram layout, the concepts presented herein allow a diagramming application to identify and resolve layout conflicts that might result from the realignment and spacing actions taken with respect to the shapes and regions.

According to one aspect presented herein, in response to receiving a request to correct a layout of a diagram having a number of shapes positioned within a list of regions, for each region, a corrected layout of shapes within the region is determined, and a minimum additional spacing around the corrected shape layout is determined. The minimum additional spacing is then used to determine corrections to the region boundaries. Accordingly, the diagram shapes and region boundaries are then sequentially repositioned for each region through the list of regions.

According to other aspects, virtual nodes are assigned to a corner of each region within a diagram having a list of regions. A dependency tree is created that defines parent and child relationships between the shapes and virtual nodes of the diagram, as well as associations between the shapes and virtual nodes according to the physical positions of the shapes in the diagram. The shapes and virtual nodes are then sequentially repositioned according to the dependency tree and any applicable layout rule.

According to yet another aspect, in response to a request to correct a diagram layout that includes at least two shapes directly glued to one another, a classification is assigned to each connection between shapes. A priority is then assigned according to the connection classifications. A dependency tree is created that defines parent and child relationships according to the physical positions of the shapes within the diagram. Finally, the shapes of the diagram are repositioned according to the dependency tree and the assigned connection priorities.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 4A and 4B are illustrative diagrams showing a shape layout before spacing and alignment correction procedures have been performed and after spacing and alignment correction procedures have been performed, respectively, according to various embodiments presented herein;

FIGS. 5 and 6 are illustrative examples of a placement tree and a dependency tree, respectively, corresponding to the diagrams shown in FIGS. 4A and 4B according to various embodiments presented herein;

FIGS. 10A, 10B, and 10C are illustrative diagrams showing a shape layout that includes a shape region before the layout has been corrected, a potential result of a layout corrective action, and a result of a layout corrective action according to various embodiments presented herein, respectively;

FIGS. 11A, 11B, and 11C are illustrative diagrams showing a shape layout before the layout has been corrected, a potential result of a layout corrective action resulting in a conflict, and a result of a conflict resolution action according to various embodiments presented herein, respectively;

FIGS. 12A, 12B, and 12C are illustrative diagrams showing a shape layout having an unconnected shape before the layout has been corrected, a potential result of a layout corrective action resulting in a conflict, and a result of a conflict resolution action according to various embodiments presented herein, respectively;

FIGS. 21A and 21B are illustrative diagrams showing a diagram layout having shapes glued to a region boundary before spacing and alignment correction procedures have been performed and after spacing and alignment correction procedures have been performed, respectively, according to various embodiments presented herein;

FIGS. 22A and 22B are illustrative examples of a placement tree, without and with connection classification and prioritization, respectively, corresponding to the diagrams shown in FIGS. 21A and 21B according to various embodiments presented herein;

DETAILED DESCRIPTION

Figure 1A:
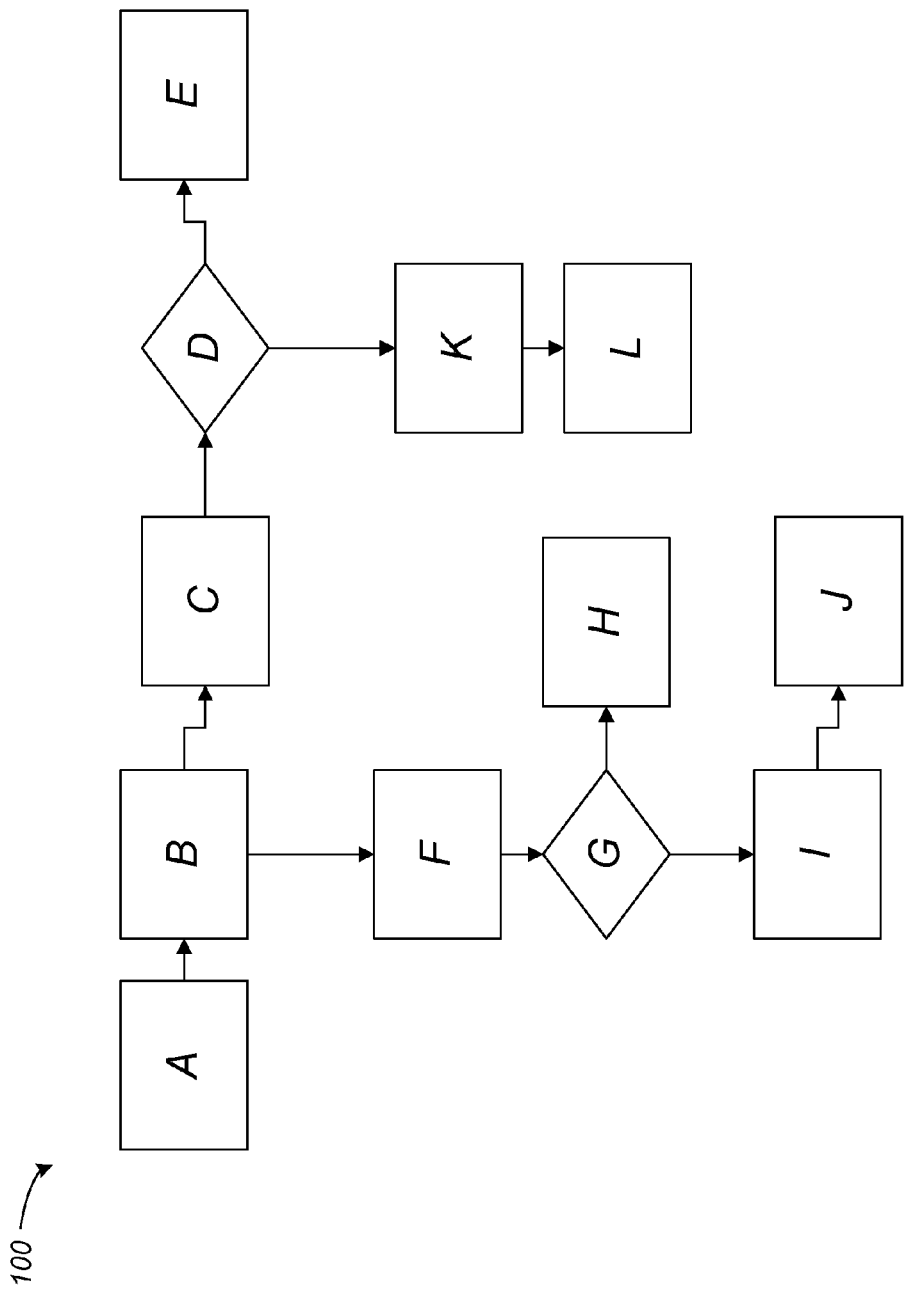
FIGS. 1A and 1B are illustrative diagrams showing a shape layout before spacing and alignment correction procedures have been performed and after spacing and alignment correction procedures have been performed, respectively, according to various embodiments presented herein.

The following detailed description is directed to technologies for adjusting the positions of shapes within a diagram. As discussed briefly above, users often spend considerable time cleaning up a diagram during and after its creation. Layout features exist in diagramming applications that attempt to assist a user in placing shapes. However, traditional automated shape layout features typically attempt to place shapes on a page according to a pre-defined template, without regard to the actual placement of shapes by the user. For example, a typical automated shape layout feature might pick up the diagram created by the user and re-arrange all of the shapes according to a pre-defined flowchart template, organizational chart template, or any other selected diagram type. The fact that the user placed a particular shape to the right of another shape instead of in another relative position is not taken into account and is not preserved in the resulting layout. As a result, the meaning associated with the diagram is often lost.

Aspects of the disclosure provided herein allow for the repositioning of shapes within a diagram to correct minor alignment and spacing discrepancies while maintaining the general layout created by the user. In the following detailed description, references are made to the accompanying drawings that form a part hereof, and which are shown by way of illustration specific embodiments or examples. Referring now to the drawings, in which like numerals represent like elements through the several figures, aspects of a computing system and methodology for correcting shape positioning within a diagram will be described.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

FIGS. 1A-3C provide various examples of diagrams before and after layout correction utilizing the concepts described herein. These examples will first be discussed as an illustrative overview of various applications of the disclosure provided herein. It should be noted that these examples are not exhaustive. Rather, the concepts discussed below may be applied to any shapes of any diagram to correct misalignment and/or uneven spacing issues.

Turning now to FIG. 1, a diagram 100 includes shapes A-L. The diagram 100 illustrates a typical diagram created by a user dragging and dropping shapes onto the page. After adding all of the desired shapes A-L and the corresponding connectors, the user has created the diagram 100 that includes unevenly spaced and misaligned shapes. For example, the space between shapes A and B is much less than the space between shapes B and C, as well as between shapes B and F. Similarly, while shapes A, B, and E are aligned along a horizontal axis, shapes C and D are offset from that axis. The result of the misalignment and uneven spacing is a diagram that is not as clean and professional as the user would typically desire. Traditionally, to "clean up" the diagram, the user would manually select shapes one at a time and nudge them up, down, left, and right until the spacing and alignment issues were corrected.

Figure 1B:
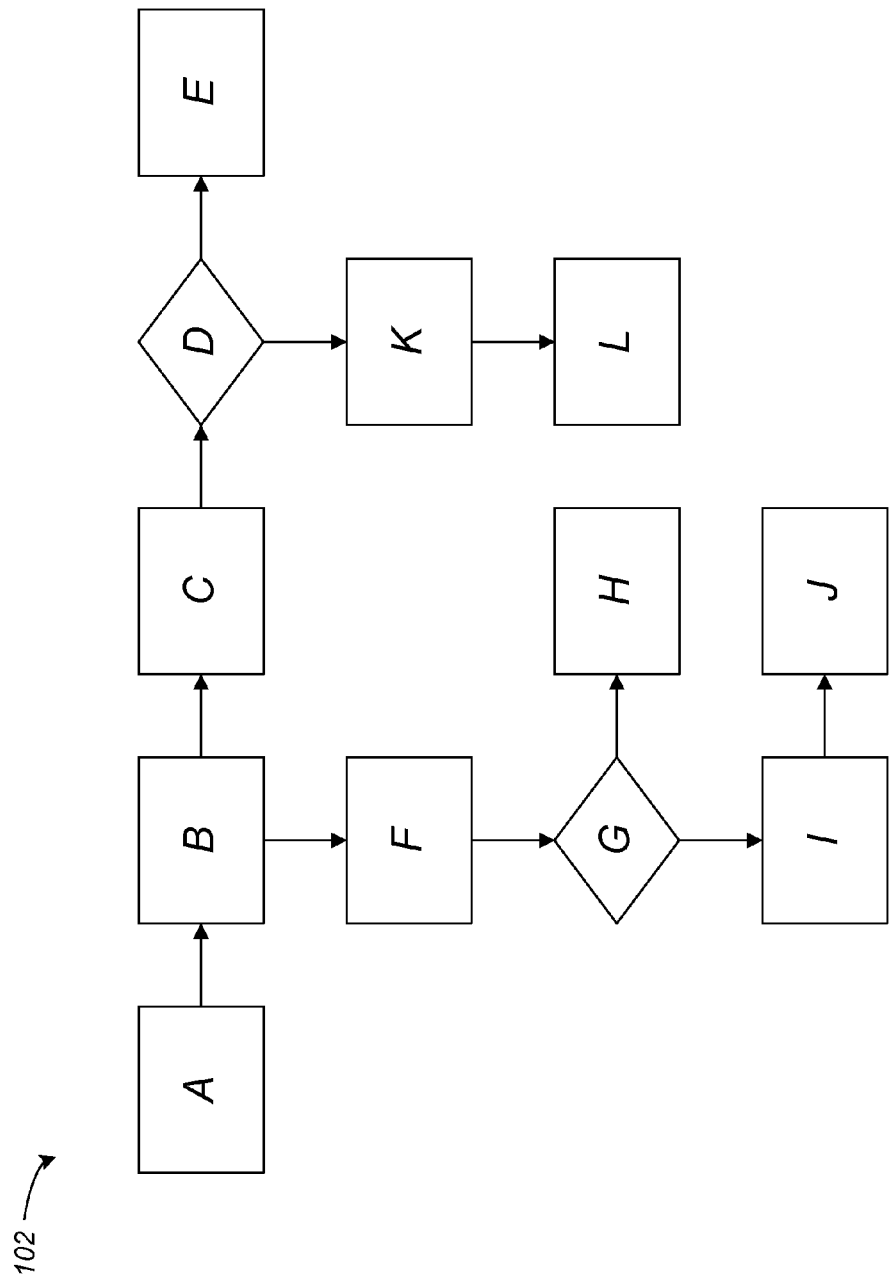

However, utilizing the embodiments described below, the user may select a single control that triggers a layout correction engine to apply one or more layout rules to reposition shapes within the diagram 100 to arrive at diagram 102, shown in FIG. 1B. Diagram 102 represents the corrected layout of diagram 100. As shown, the spacing between shapes A-L has been standardized and the shapes have been horizontally and vertically aligned. As will be described further below, the layout correction engine may be a diagramming application, a portion of a diagramming application, or any other application or module operative to perform the layout correction procedures described herein.

Figure 2A:
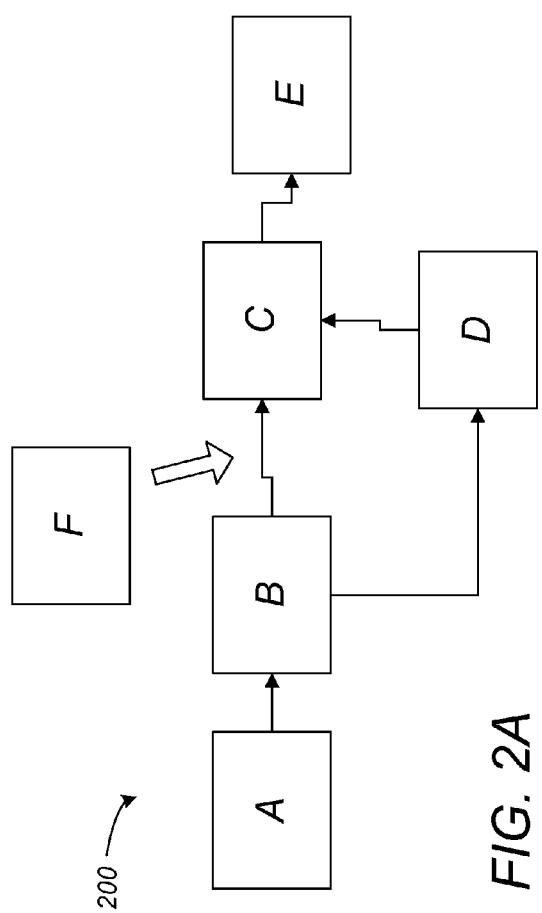
FIGS. 2A and 2B are illustrative diagrams showing a shape layout before a shape has been inserted into the diagram and after a shape has been inserted into the diagram, respectively, according to various embodiments presented herein.
Figure 2B:
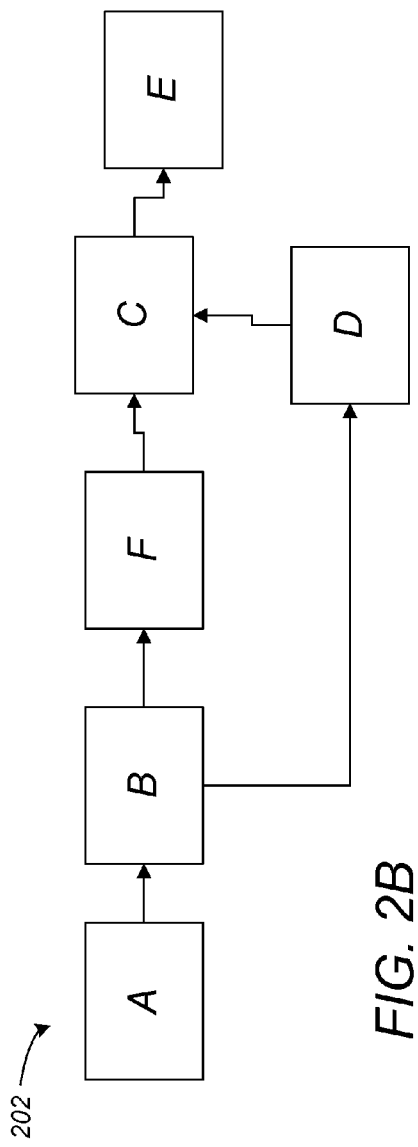

FIG. 2A shows an illustrative diagram 200 that includes shapes A-E. In this example, the user is inserting shape F into the diagram 200 between shapes B and C to create diagram 202 shown in FIG. 2B. Traditionally, the user would have to manually move shapes C, D, and E over to the right to make room for shape F, drop shape F into the created space, attach the connector between shapes B and C from shape B to shape F, and add another connector from shape F to shape C. However, utilizing the embodiments described herein, the user may simply drop shape F onto the connector between shapes B and C. This action triggers the layout correction engine to evenly space shape F from shape B, split the connector between shapes B and C as shown in FIG. 2B, and push shapes C, D, and E out to the right. It should be noted that the offsets, or relative positions between shapes in the original diagram 200, are maintained in diagram 202.

Alternatively, it should be appreciated that triggering the layout correction engine to reposition any shapes in a diagram through any requested action by the user may not only trigger the layout correction engine to perform the requested action (i.e., inserting a new shape), but also to reposition all of the shapes within the diagram to correct for misalignment and uneven spacing. In this alternative embodiment, inserting shape F into the diagram 200 would create a diagram similar to diagram 202, however all of the shapes A, B, F, C, and E would be realigned on a common horizontal axis and be evenly spaced apart, while shape D would be spaced an equivalent distance below shape C and be vertically aligned with shape C.

Figure 3A:
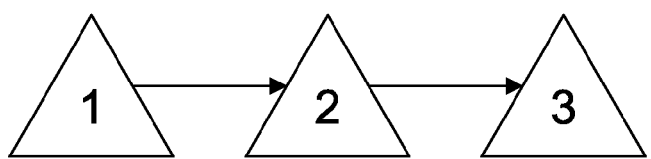
FIGS. 3A, 3B, and 3C are illustrative diagrams showing a shape layout before the diagram has been rotated, a potential result of a rotation action, and a result of a rotation action according to various embodiments presented herein, respectively.
Figure 3B:
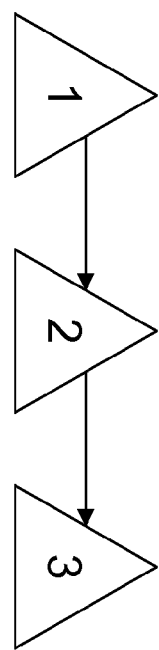
Figure 3C:
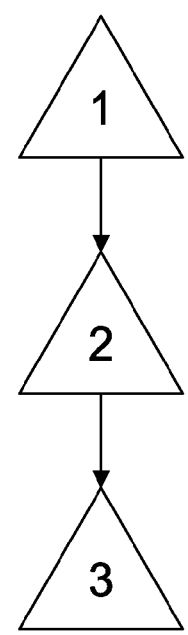

FIG. 3A shows an illustrative diagram 300 that includes shapes 1-3. There are often times in which a user would like to rotate a diagram, or portion of a diagram, to alter the orientation of the diagram without changing the orientation of the shapes. For example, diagram 302 of FIG. 3B shows a traditional result of rotating diagram 300. As seen in diagram 302, the shapes 1-3 and the corresponding text are rotated 90 degrees. However, the user may have desired to simply change the flow of the diagram from a left to right layout to a top to bottom layout. The disclosure described herein allows the user to rotate the diagram in a manner that alters the orientation, but not the individual shape configuration, as seen as diagram 304 in FIG. 3C.

Having described some general concepts of the embodiments in context with the various layout correction requests shown in FIGS. 1A-3C, various aspects of the disclosure that allow the layout correction engine to alter the positions of shapes within a diagram will now be described. FIGS. 4A and 4B show pre-correction diagram 400 and corrected diagram 402. The corrected diagram 402 shows shapes A-E, properly aligned and evenly spaced, after the layout correction engine has modified the pre-correction diagram 400. According to various embodiments, the layout correction engine builds and utilizes a placement tree 500 and a dependency tree 600, shown in FIGS. 5 and 6, respectively. It should be noted that throughout this disclosure, the terms "placement tree 500" and "dependency tree 600" refer to any placement tree and dependency tree created and utilized according to the concepts described herein, such as those shown in FIGS. 5 and 6, and are not limited to the specific shapes and relationships of the embodiments shown in FIGS. 5 and 6.

In order to accurately reposition shapes within a diagram to correct layout issues while still preserving the user's original layout as closely as possible, the layout correction engine establishes relationships between the shapes, both from a parent-child perspective and from a relative position perspective. According to one embodiment, the placement tree 500 defines the parent-child relationships between the various shapes of the diagram. The placement tree 500 organizes the shapes in a parent-child manner such that each shape in the diagram appears only once in the placement tree 500 and has only one parent. In doing so, the layout correction engine resolves any ambiguity around multiple parents. For example, as seen in diagram 402, shape C has two parents, shapes B and D. The layout correction engine eliminates this ambiguity by selecting shape B as the parent of shape C, as seen in the placement tree 500.

If the diagram has loops, the layout correction engine will again resolve those loops so that each shape in the placement tree 500 has only one parent and the tree flows only downward or in a single direction. The layout correction engine will utilize a set of placement tree rules when creating the placement tree 500. These rules will assist the layout correction engine in choosing a single parent in a situation, such as that described above with respect to diagram 400, in which a shape has two or more incoming connectors, indicating more than one parent.

It should be appreciated that the placement tree rules may use any quantity and type of criteria for selecting a parent shape, including but not limited to shape characteristics, shape proximities, shape alignments, intervening shapes, and any other criteria. For example, the placement tree rules may guide the layout correction engine into selecting shape B of diagram 400 as the parent to shape C instead of shape D, since shape C is configured in-line with shapes B and E in the main diagram branch, while shape D is aligned below the main diagram branch.

In addition to establishing parent-child relationships, the placement tree 500 establishes an order in which a given shape's child shapes should be processed when repositioning shapes in a diagram. Similar to the determination discussed above as to which shape (shape B or shape D) to use as the parent of shape C, the layout correction engine utilizes the placement tree rules to determine the processing order of the two branches. For example, because shape C is part of the main diagram branch and has an associated child shape, shape E, the determination is made to process the branch of the placement tree 500 containing shape C prior to the branch of the placement tree 500 containing shape D.

For a connected diagram in which all shapes are connected to at least one other shape using a connector line, the connector lines are used to establish the parent-child relationships in the placement tree 500. However, there are often unconnected shapes within a diagram. One example includes text placed on the page to describe one or more shapes. According to one embodiment, for unconnected shapes, rules provide for a child relationship to be established from the nearest connected shape or from the nearest unconnected shape that already has a relationship defined in the placement tree 500. It should be appreciated that the rules may provide a limit as to how far an unconnected shape may be from another shape in order for the parent-child relationship to be established. Moreover, diagrams may not only include shapes that are connected via a connector line and unconnected shapes, but may also include shapes that are directly connected, or glued, to other shapes or regions within the diagram. Various embodiments with respect to this unique scenario will be shown and described in detail below with respect to FIGS. 19A-23.

Returning to FIGS. 5 and 6, after creating the placement tree 500, according to one embodiment, the layout correction engine creates the dependency tree 600. According to embodiments provided herein, the layout correction engine positions shapes in a diagram utilizing each shape's offset, or relative position, from another shape that it depends on. The dependency tree 600 defines the positional dependency relationships between the various parent-child-sibling shapes established by the placement tree 500. The layout correction engine utilizes dependency tree rules to create the dependency tree 600 from the diagram. It should be appreciated that the dependency tree rules may use any quantity and type of criteria for determining which shape a given shape depends on for its positioning. As an example, according to one implementation, a shape is dependent on the closest parent or sibling that it virtually overlaps. When correcting a diagram layout, the layout correction engine will reposition each shape sequentially according to the dependency tree.

It should be noted that the placement tree 500 is used to resolve any ambiguity about parent-child relationships in the diagram. The dependency tree 600 is built using the placement tree 500 and defines the parent-child relationships within the diagram and their positional relationships, including the offsets that define where each shape is positioned with respect to another shape. When placing the shapes during a layout corrective action, the layout correction engine will step through the dependency tree 600 in order, placing shapes according to the relationships and offsets of the dependency tree 600. It should be appreciated that although this disclosure describes layout correction with respect to the creation and utilization of a placement tree 500 and a dependency tree 600, according to alternative embodiments, the layout correction engine may resolve parent-child ambiguity as the dependency tree 600 is created, without specifically creating the placement tree 500.

Figure 7:
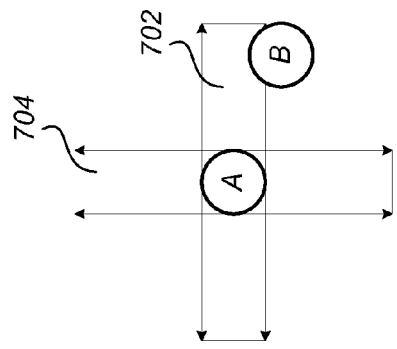
FIG. 7 is an illustrative diagram showing the virtual overlap between two shapes according to various embodiments presented herein.

FIG. 7 illustrates virtual overlapping. Virtual overlapping occurs when one shape is within the axis-aligned extended edges of another shape. As seen in FIG. 7, shape A has horizontal overlap region 702 and vertical overlap region 704. Because shape B is located within the horizontal overlap region 702, shape B is considered to virtually overlap shape A. According to various embodiments, the boundaries of the overlap regions may be aligned to the edges of the shape, as shown in FIG. 7, or may be closer together or farther apart with respect to the edges of the shape according to a predetermined tolerance.

According to one illustrative implementation, if a shape does not virtually overlap its parent or siblings, then if the shape is closer to or the same distance from its nearest sibling than to its parent and that sibling is closer to or the same distance from the parent than the shape is, then the shape is dependent on the sibling. Otherwise, the shape is dependent on its parent. It should be noted that shapes may be positionally dependent on siblings or parents. The manner in which shapes are connected in the diagram is not central to the creation of the dependency tree. In fact, various embodiments allow connected shapes to be dependent on unconnected shapes for positioning purposes.

Figure 8A:
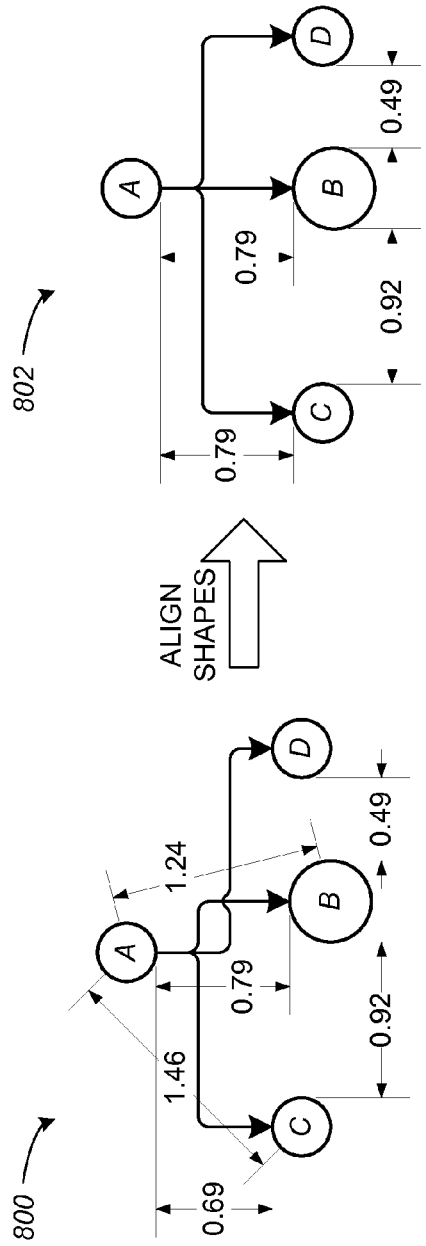
FIGS. 8A and 8B are illustrative diagrams showing a shape layout before and after alignment correction procedures have been performed, respectively, to demonstrate the application of rules to create a dependency tree and correct the shape layout.
Figure 8B:
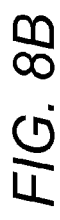

FIGS. 8A and 8B illustrate layout correction according to one embodiment that utilizes the dependency tree rule described above. Looking at FIG. 8A, shape B virtually overlaps shape A along a vertical axis. Because shape B is the closest child to shape A and shape B virtually overlaps its parent shape A, shape B is aligned with shape A, as seen in FIG. 8B. Shape C is aligned to shape B since they virtually overlap along a horizontal axis. Similarly, shape D is aligned to shape B since they virtually overlap along a horizontal axis. Because all children are below the parent, they are top aligned.

After creating the placement tree 500 and the dependency tree 600, the layout correction engine utilizes the dependency tree 600 when applying the layout rules to correct the diagram layout per the request from the user. Given the dependency tree 600, the layout correction engine can determine how to move child shapes to follow their parent shapes when the parent shapes are repositioned, and when a given shape is repositioned, what other shape to compare its position to in order to determine exactly where to place it in the diagram.

As an example, when correcting the alignment and spacing of shapes A-E in diagram 400 of FIG. 4A, the layout correction engine creates the placement tree 500 and the dependency tree 600 shown in FIGS. 5 and 6, respectively. The layout correction engine begins repositioning the shapes in order according to the dependency tree 600. First, shape B is evenly spaced from shape A and properly aligned. Doing so may move shape B to the right slightly as seen in the corrected layout of diagram 402. The dependency tree 600 contains the offset from shape B to shape C. It should be understood that the layout correction engine may calculate the offset of each shape within the diagram with respect to the shape from which it depends and store that information as part of the dependency tree 600 or separately from the dependency tree 600. Because the offset of shape C from shape B is known, the act of moving shape B does not alter shape C's relative position to shape B. In effect, shape C follows shape B when shape B is repositioned.

According to one embodiment, when shape C follows shape B, all other shapes in the dependency tree 600 that are subordinate to shape B, specifically shapes C-E, follow shape B as well using the calculated offsets from the dependency tree 600. Continuing down the dependency tree 600, the layout correction engine next repositions shape C. Shape C is repositioned prior to shape D, since when creating the placement tree 500, the layout correction engine determined that the branch containing shape C should be processed prior to the branch containing shape D. The order is designated in the placement tree 500 as "1" and "2." Shape C is then repositioned in alignment with and evenly spaced from shape B, which moves it down and to the left as shown in FIG. 4B. According to the dependency tree 600, shapes D and E rely on shape C for their positions, so they effectively follow shape C using the calculated offsets in the dependency tree 600.

Shape E is repositioned in alignment with and evenly spaced from shape C. Finally, it should be noted that according to the placement tree 500, shape D's parent is shape B. However, when building the dependency tree 600, it was determined that shape D's position is dependent on shape C. During dependency tree 600 calculation, the layout correction engine determined that shape D was closer to shape C and nearly lined up with shape C, so the determination was made that shape D's position is more related to shape C than to its parent, shape B. As a result, shape D is aligned with and evenly spaced from shape C, but in the same general direction as it was located in diagram 400, specifically below shape C. This information is available to the layout correction engine from the offset in the dependency tree 600 and is used to preserve the original layout configuration created by the user.

It should be understood that the principles described above with respect to correcting diagram layouts by creating and utilizing the placement tree 500 and the dependency tree 600 may be applied to repositioning diagram shapes while responding to a user request to modify the diagram, as discussed above with respect to FIGS. 1A-3C. For example, turning back to FIGS. 2A and 2B, when the user inserts shape F into the diagram 200, the layout correction engine pushes shape C over to the right to make room for shape F. When moving shape C to the right, all of the subordinate shapes, specifically shapes D and E, follow shape C to the right. The calculated offsets from the dependency tree 600 are utilized to ensure that shapes D and E are each positioned in the same location with respect to shape C as they were positioned in diagram 200. For shape F, if the layout correction engine determines that shape F is a child of shape B, then shape F will be spaced and aligned from shape B and shape C will become a new child of shape F. Accordingly, the offset of shape C from shape F will be maintained as it was originally offset from shape B.

According to another implementation, when shape F is inserted into the diagram 200, the layout correction engine determines whether there is room to evenly space shape F from shape B without conflicting with shape C. If there is room, then shape F will be inserted without moving shape C and any subordinate shapes and the connectors will be modified as described above. However, if the layout correction engine determines that shape C is to be moved to make room for shape F, then shape C would be evenly spaced from shape F and the corresponding subordinate shapes would be moved as described above.

According to one implementation, shape C must depend on shape B when the dependency tree 600 is created in order to insert shape F between. The shapes between which the new shape will be inserted must depend on one another. Therefore, if shape F were inserted between shapes B and D, then a different dependency tree 600 would have to be created to ensure proper spacing and alignment of shape F from shape B and of shape D from shape F.

Similarly, just as the placement tree 500 and the dependency tree 600 creation and utilization allows for diagram layout correction upon the insertion of a new shape, the layout correction engine may utilize the placement tree 500 and the dependency tree 600 to flip or rotate diagrams as described above with respect to FIGS. 3A-3C. For example, when the layout correction engine applies a layout rule associated with rotating a diagram 90 degrees, the offsets from the dependency tree 600 are maintained, only shifted 90 degrees to reposition the shapes as requested. In this manner, the diagram may be altered to change flow directions without affecting the general positioning of the shapes with respect to one another.

Figures 9A, 9B:
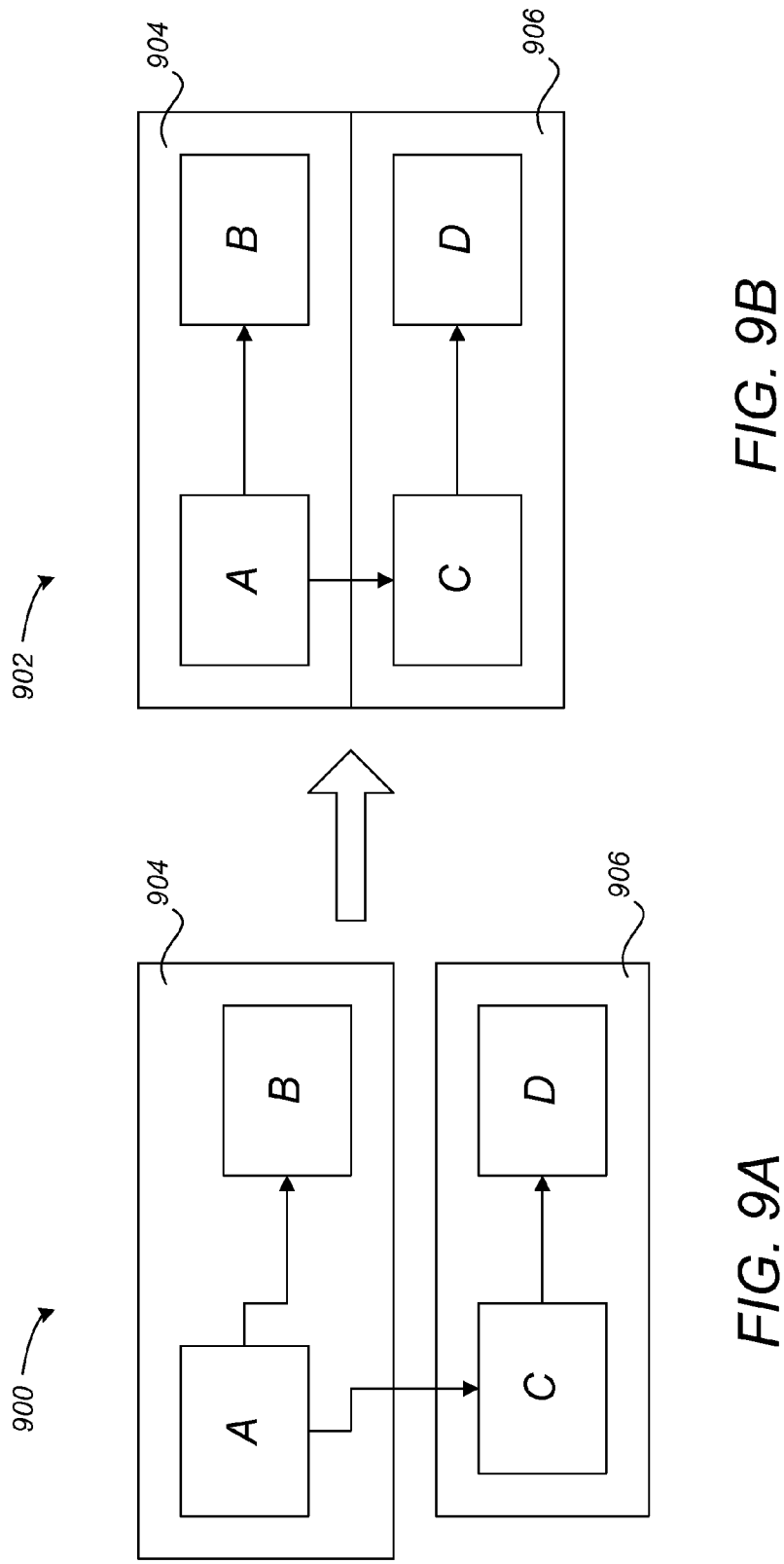
FIGS. 9A and 9B are illustrative diagrams showing a shape layout that includes multiple shape regions before spacing and alignment correction procedures have been performed and after spacing and alignment correction procedures have been performed, respectively, according to various embodiments presented herein.

Diagramming applications may allow for the grouping of shapes into regions. One example of a region is a container. Containers and other constrained regions may be identified by a box or other boundary surrounding the member shapes or via any other means for visually identifying a group of shapes. It is typically desirable that the region membership, or group of shapes assigned to the region, is preserved. It would not be desirable for a member shape to be repositioned outside of the region boundaries or for a non-member shape to be repositioned inside of the region boundaries. FIGS. 9A and 9B show before and after correction diagrams 900 and 902, respectively, which illustrate how aspects of the disclosure may be applied to shapes within regions and with regions themselves.

For example, creating and applying the placement tree and dependency tree concepts described above to the shapes A-D of diagram 900, the layout correction engine aligns shapes A and B within the region 904, and then aligns shapes C and D to shapes A and B. According to one embodiment, regions attempt to follow the repositioning of shapes within the regions. In some cases, as shown in FIGS. 9A and 9B, adjusting regions to correspond with the repositioning of member shapes within is not a problem. The region 906 is expanded, aligned, and spaced with respect to region 904 to accommodate the repositioning of shape C. Region 904 is reduced in height as a result of aligning shape B to shape A. It should be appreciated that the layout rules may be established to correct the layout in any number of ways. For example, the shapes B and D could have been adjusted such that they are evenly spaced with shapes A and C in the same manner that shape C is spaced from shape A. Additionally, the regions 904 and 906 may be positioned by the layout correction engine so that they remain spaced apart or so that they abut one another as shown.

There are situations in which simply moving and resizing the region to accommodate repositioning of member shapes within does not provide a desirable outcome. Turning to FIGS. 10A-10C, an illustrative example of correcting the layout of a diagram 1000 containing a region 1006 will be described. FIG. 10A shows the diagram 1000. The diagram 1000 has a region 1006 that contains member shapes E, F, and G. The user would like to correct the layout of the diagram 1000 to adjust the spacing between the shapes A-H. If the layout correction engine adjusted diagram 1000 to set even spacing, then shapes E and G might move closer to their parents, shapes D and C, respectively. It should be clear that if the dependency tree 600 created a dependency between shapes F and G, then shape G would not be repositioned closer to its parent shape C. However, because shapes F and G do not have a sibling relationship that would create a dependency of one shape on the other, according to one implementation, shape G is evenly spaced from shape C as shown in FIG. 10B. Doing so might extend the boundaries of the region 1006 upward to follow shape G, creating region 1008. This is an undesirable result since extending the boundaries of region 1006 to create region 1008 would now introduce shape D into the region 1008. Shape D is not a member of the region 1006 and should not be added to the region membership to create a new region 1008.

FIG. 10C shows diagram 1004, which is the desired outcome of a layout corrective action taken on diagram 1000. According to various embodiments, the layout correction engine ensures the outcome shown in FIG. 10C through an ongoing analysis of shapes and regions to perform region corrections as shapes are placed while traversing the dependency tree 600. In order to manage shape movement between shapes that are inside and outside the boundaries of a region and ensure that region membership is preserved, the layout correction engine identifies two types of shapes that affect the position of the region's boundaries.

The first type of shape is an entry node 1110. An entry node 1110 is a shape in the region whose parent shape is outside the region. Entry nodes 1110 have an associated entry direction that is determined according to the offset between the entry node 1110 and its parent. In diagram 1004, shapes E and G are entry nodes 1110 for the top boundary of the region 10006 since shapes E and G are positioned below parent shapes D and C, respectively. The second type of shape that affects the position of the region's boundaries is an exit node 1112. Exit nodes 1112 are shapes outside the region whose parent shapes are inside the region. In diagram 1004, shape H is an exit node 1112 since it is located outside of the region 1006 while its parent shape, shape G, is within the boundaries of the region 1006.

When traversing the dependency tree 600 and repositioning shapes, the size of a region and its boundaries are considered undetermined until an entry node 1110 is placed. When the layout correction engine places an entry node 1110, the layout correction engine calculates the size and position of the boundaries based on the entry nodes 1110, the parents of the exit nodes 1112, and the layout correction of the member shapes within. Once the boundaries of the region have been determined, the layout correction engine locks or otherwise fixes the boundaries.

The layout correction engine attempts to maintain the boundaries of the regions as compactly laid out as possible. To do so, excess movement of the boundaries is restricted. The layout correction engine identifies and tracks the entry nodes 1110 and exit nodes 1112, along with the size of their sub-trees, or set of shapes subordinate to a given shape. To determine the position of the top boundary of a region, the top boundary is placed at the lowest position that allows entry nodes 1110 entering from the top to be within the region and exit nodes 1112 leaving the top boundary to be outside the region. Doing so may not leave sufficient room for the shapes inside the region to all fit within the region. In these situations, the opposing boundary, which in this scenario is the bottom boundary, is adjusted to be a fixed distance from the top boundary that allows enough room inside the region to accommodate its member shapes.

It should be understood that an entry node 1110 can be offset from its parent in two directions. The entry node 1110 may only be considered an entry node 1110 for one side of the region. As an example, if in diagram 1000, shape D were more to the left, shape E could be an entry node for either the top or left boundaries since it would be offset down and to the right from shape D. In this situation, the layout correction engine calculates outcomes for both possibilities and selects the one that leaves the shapes with the least overall deviation from the original dependency tree 600. Doing so represents the smallest change in the relative offsets between parents and children.

As mentioned above, there are scenarios in which a diagram user would like to make adjustments to the shapes within a diagram, but the diagram imposes specific constraints on the positioning of the shapes. One typical example is when the diagram includes a list of regions, or overlapping lists of regions. Another example includes shapes that are glued directly to other shapes without the use of connecting lines. Various embodiments that manage diagram layout correction under these types of constraints will be described in detail below with respect to FIGS. 14A-22.

Turning now to FIGS. 11A-12C, conflict resolution will be discussed. When shapes are repositioned to comply with the layout correction request from the user, it is possible that one or more repositioned shapes may overlap one or more other shapes or areas in the diagram, such as a page break, where placement is not desirable. When this occurs, the disclosure provided herein provides the layout correction engine with a set of conflict resolution rules to aid in further repositioning shapes to avoid overlap. The layout correction engine attempts to nudge or otherwise reposition the conflicting shape or region as little as possible to avoid the conflict while preserving the overall diagram layout intended by the user.

According to one embodiment, the layout correction engine utilizes the established parent-child relationships and the calculated offset of the child from its parent to determine a direction in which the applicable portion of the diagram is flowing. The intention is to push the conflicting shape out in the general direction in which that part of the diagram flows. It should be appreciated that embodiments provide a threshold limit corresponding to how far out a shape may be pushed before looking for available space in an alternative direction.

FIG. 11A shows a diagram 1100 that has not been subjected to layout corrective actions by the layout correction engine. After repositioning shapes in an effort to evenly space the shapes in the diagram 1100, one implementation results in diagram 1102 shown in FIG. 11B. Diagram 1102 includes two shape conflicts. The first conflict occurs at the location in which shape B1 overlaps shape D. The second conflict occurs at the location in which shape B2 overlaps shape D1. One solution to the conflict would be to independently moves shapes D and D1. However, moving these shapes independently would have the negative effect of breaking up the diagram and altering the layout in a manner that is presumably not consistent with the original intent of the user. Therefore, when resolving conflicts, the conflict resolution rules instruct the layout correction engine to attempt to move the conflicting shape and its first level of children together. FIG. 11C shows diagram 1104, which results from moving conflicting shape D and children D1-D3 together. The result is a diagram 1104 that is neatly spaced and aligned, while maintaining the general layout configuration of the original diagram 1100.

According to various embodiments, the conflict resolution rules allow for shapes to interleave one another in order to best utilize the available diagram space, which may minimize the distance that one or more shapes must be moved to resolve a conflict. FIG. 12A shows a diagram 1200 in which an unconnected shape is positioned between shapes C1 and C2. FIG. 12B shows one possible result, diagram 1202, when layout corrections are made to diagram 1200 according to the disclosure herein, which evenly spaces shapes B and C from shape A. In diagram 1202, shapes C1 and C2 overlap shape B and the unconnected shape originally positioned between shapes C1 and C2 to create two conflicts. FIG. 12C shows one possible resolution in which shapes C1 and C2 are allowed to interleave with the unconnected shape.

It should be understood that according to various embodiments of the disclosure provided herein, unconnected shapes may or may not participate in layout corrections. According to the embodiment shown in FIGS. 12A-12C, the unconnected shape is not repositioned during layout correction procedures. However, according to an alternative embodiment, the unconnected shape may have been treated as a child of shape C via a virtual connection and dependent upon shape C1 or C2 for positioning when the placement tree 500 and dependency tree 600 were built by the layout correction engine. In this implementation, the unconnected shape may have been repositioned along with shapes C1 and C2 in diagram 1202 such that the offset between the unconnected shape and shape C1 or C2 from which it depends remained the same. Of course, the conflict between shapes C1 and B would still have remained and required resolving.

Figure 13A:
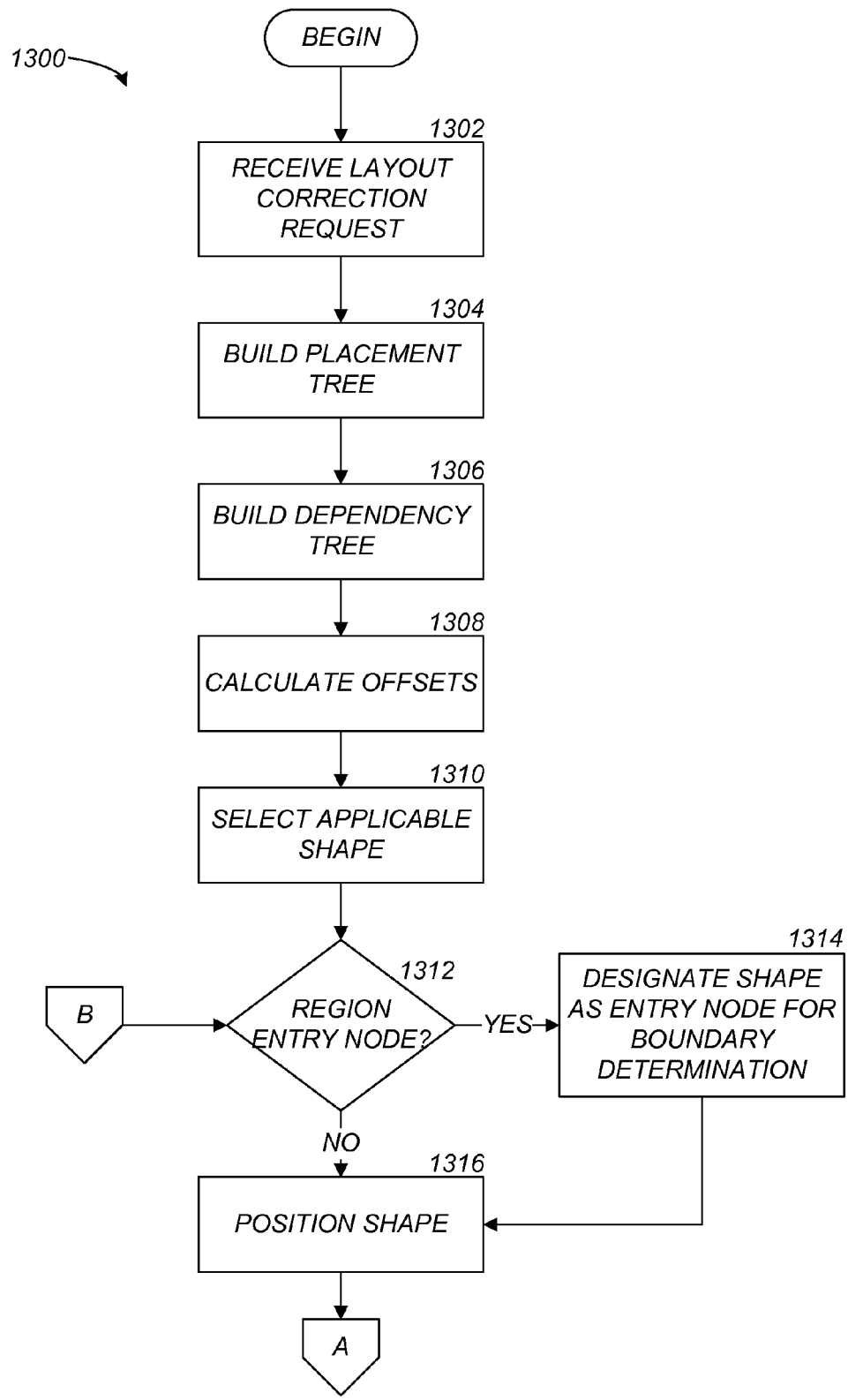
FIGS. 13A and 13B are flow diagrams showing an illustrative process for correcting the positions of shapes in a diagram according to various embodiments presented herein.
Figure 13B:
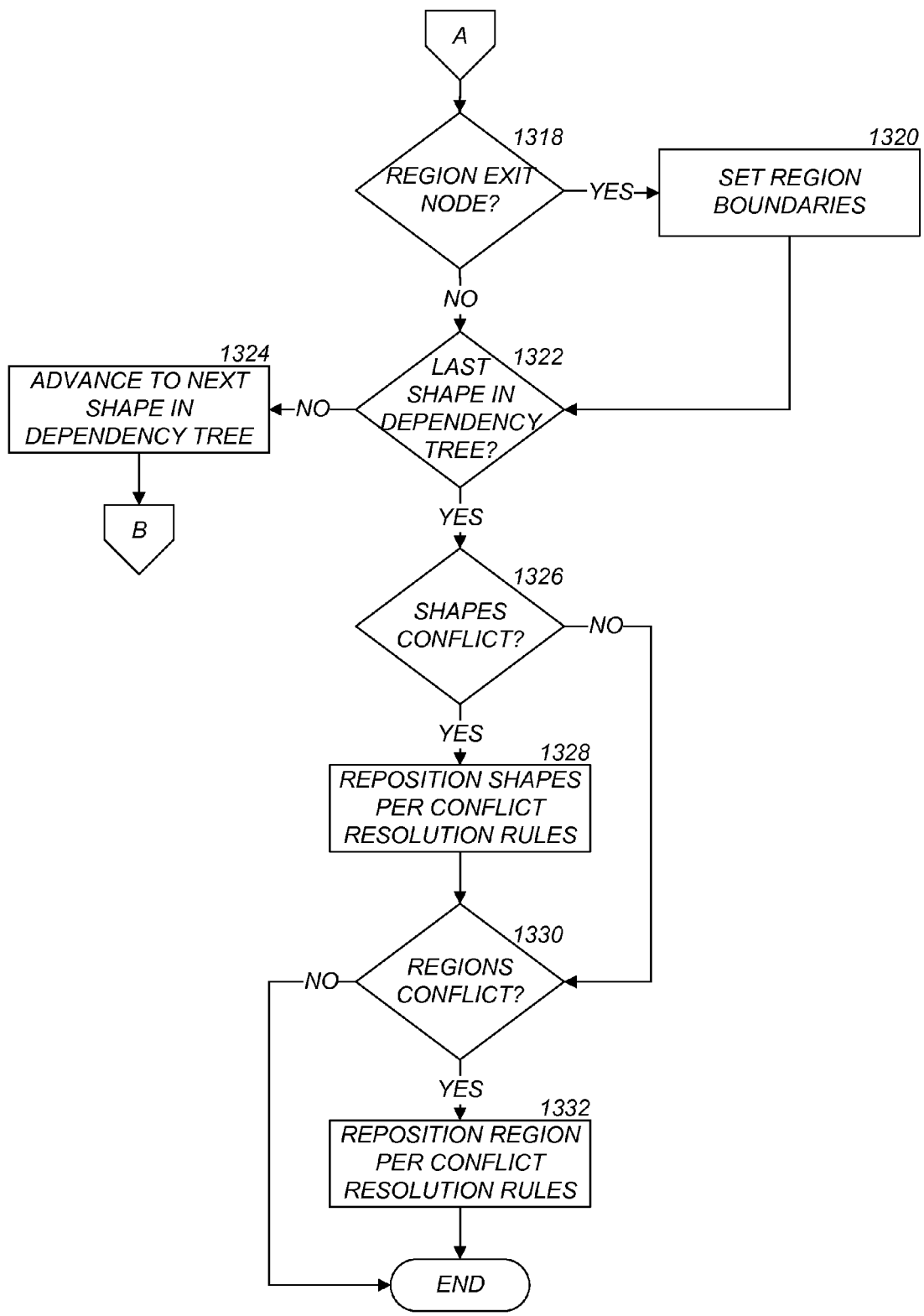

Referring now to FIGS. 13A and 13B, additional details will be provided regarding the embodiments presented herein for correcting positions of shapes in a diagram. In particular, FIGS. 13A and 13B show a flow diagram illustrating aspects of the operation of the layout correction engine in performing layout corrections according to the disclosure provided herein. It should be appreciated that the logical operations described with respect to the various flow diagrams herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system.

Accordingly, the logical operations described with respect to the various flow diagrams herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 1300 begins at operation 1302, where the layout correction engine receives a layout correction request from the user. As discussed above, this request may be triggered from the user's selection of a control via a user interface or may be triggered from an action taken by the user when building or editing a diagram (i.e. inserting a shape). From operation 1302, the routine 1300 continues to operation 1304, where the layout correction engine creates the placement tree 500 that resolves any ambiguity in establishing parent-child relationships amongst the shapes in the diagram. The routine 1300 continues to operation 1306, where the layout correction engine creates the dependency tree 600 that establishes positional relationships between shapes.

From operation 1306, the routine 1300 continues to operation 1308, where the layout correction engine calculates the offsets of each shape from their corresponding dependent shapes according to the dependency tree 600. It should be appreciated that this operation may occur during the creation of the dependency tree 600 and stored as a part of the dependency tree 600. The routine 1300 continues from operation 1308 to operation 1310, where the layout correction engine selects the first shape from the dependency tree 600 that will require repositioning. At operation 1312, the layout correction engine determines whether the selected shape is an entry node 1110 of a region. If the selected shape is an entry node 1110, then the routine 1300 proceeds to operation 1314, where the layout correction engine designates the shape as such to be used in setting the region boundaries as discussed above. From operation 1314, the routine continues to operation 1316 and continues as described below.

If at operation 1312, the layout correction engine determines that the selected shape is not an entry node 1110, then the routine proceeds to operation 1316, where the layout correction engine positions the shape according to the layout rules. As described in detail above, positioning the shape includes utilizing the dependency tree 600 to determine the positional offset of a shape from another shape from which it depends. The routine 1300 continues from operation 1316 to operation 1318, where the layout correction engine determines whether the shape is an exit node 1112. If the shape is an exit node 1112, then the routine 1300 proceeds to operation 1320, where the layout correction engine sets and locks the region boundaries around the entry node 1110, the parent of the exit node 1112, and any intervening member shapes. As described above, the layout correction engine may attempt to minimize the region's boundaries. The routine 1300 then continues to operation 1322 from operation 1320 and proceeds as described below.

However, if at operation 1318, the layout correction engine determines that the selected shape is not an exit node 1112 of a region, then the routine 1300 proceeds to operation 1322, where the layout correction engine determines whether the selected shape is the last shape in the dependency tree 600. If the selected shape is not the last shape in the dependency tree 600, then the routine 1300 proceeds to operation 1324, where the layout correction engine advances to the next shape in the dependency tree 600 and the routine 1300 returns to operation 1312 and continues as described above. However, if at operation 1322, the layout correction engine determines that the selected shape is the last shape in the dependency tree 600, then the routine 1300 proceeds to operation 1326, where the layout correction engine determines if there are any conflicts. As described above, conflicts may arise when one or more shapes or regions overlap and when a shape or region overlaps a page break. It should be appreciated that the conflict resolution rules may define any type of layout characteristic as a conflict and provide logic as to how the conflict is to be resolved.

If the layout correction engine determines that none of the repositioned shapes create a conflict, then the routine 1300 proceeds to operation 1330 and continues as described below. However, if at operation 1326, the layout correction engine determines that one or more repositioned shapes create a conflict, then the routine 1300 proceeds to operation 1328, where the layout correction engine repositions one or more shapes according to the conflict resolution rules. From operation 1328, the routine 1300 continues to operation 1330, where the layout correction engine determines whether there is a conflict corresponding to or within any regions. If there is not a region conflict, then the routine 1300 ends.

However, if the layout correction engine determines that there is a region conflict, then the routine 1300 proceeds to operation 1332, where the layout correction engine repositions one or more regions, or shapes within one or more regions, according to the conflict resolution rules. As described above, according to various embodiments, regional boundaries and shape membership issues are resolved during the shape placement process, which eliminates or minimizes conflicts of these types after the layout corrections have been made. For this reason, most region conflicts will occur as a result of a region overlapping a shape or from a shape overlapping a region after the layout corrections. After resolving the region conflicts at operation 1332, the routine 1300 ends.

As mentioned above, there are scenarios in which a diagram user would like to make adjustments to the shapes within a diagram layout, but the position of one or more shapes within the diagram is constrained due to region considerations. For example, it may be desirable that shapes within regions remain bound by the regions after layout is complete and that shapes not within a region are not added to a region as a result of a layout activity. Moreover, while regions can be moved and resized themselves, similar to the member shapes contained within, regions may also provide additional constraints on diagram layout. These constraints may include interior or exterior heading areas at one or more sides of the regions where member shapes are not to be placed, and margins around an interior or exterior perimeter of the regions that may further constrain diagram layout, such as allowing shapes to remain in the margin during layout or disallowing shapes to be added to the margin during layout.

Figure 14A:
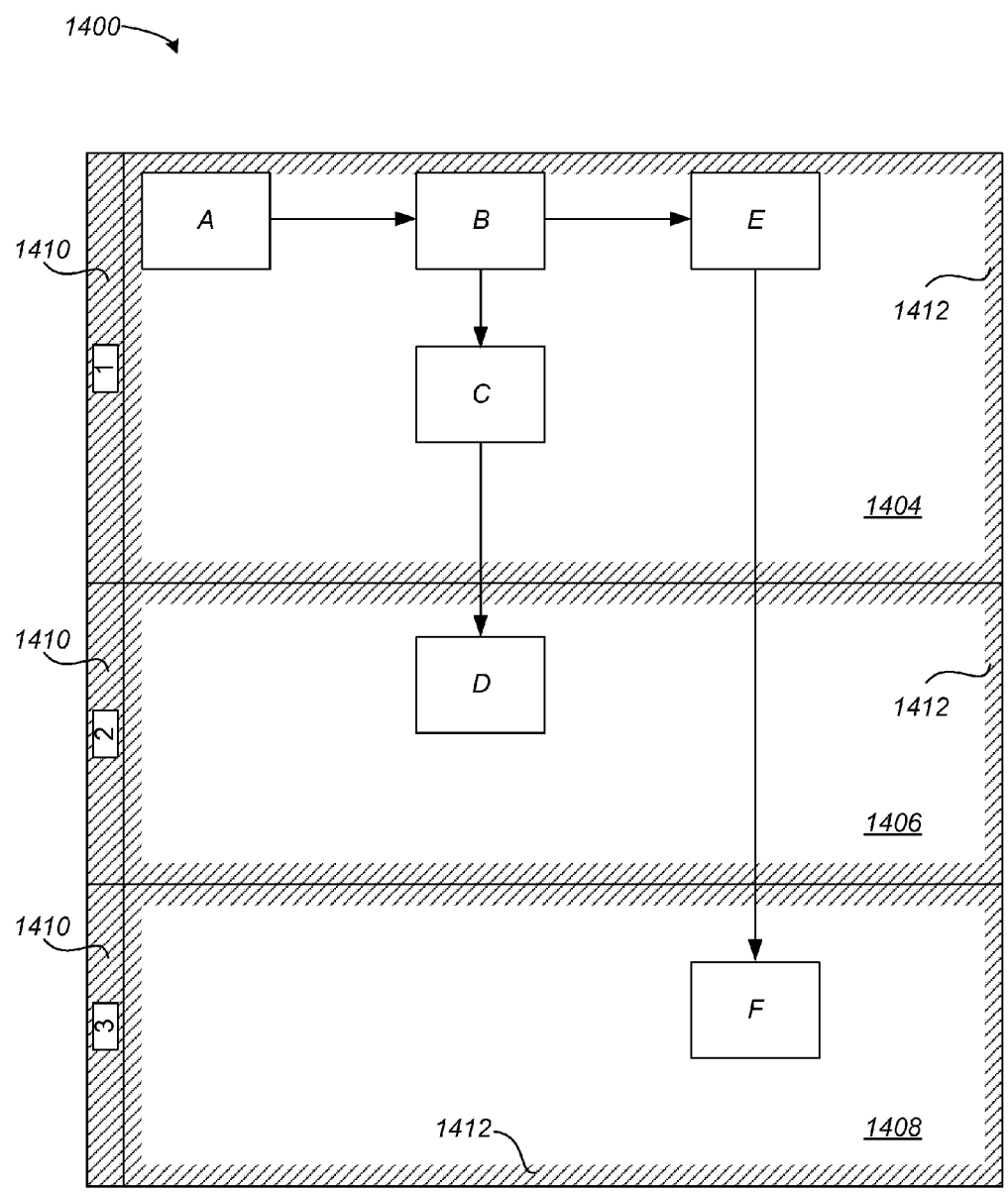
FIGS. 14A and 14B are illustrative diagrams showing a diagram layout having a list of regions before spacing and alignment correction procedures have been performed and after spacing and alignment correction procedures have been performed, respectively, according to various embodiments presented herein.

A typical example of a diagram includes a list of regions, or overlapping lists of regions. With lists of regions, shapes are often placed within the various regions and interconnected within the regions and between regions. A list of regions may include any number of containers that abut one another to create a "list" of containers or regions. One embodiment that illustrates a list of regions is shown in FIG. 14A. FIG. 14A illustrates an example of a list of regions 1400 that takes the format of a cross-functional flowchart ("CFF"), or swimlane diagram. A CFF may include a process flow diagram with shapes separated into a grid of regions, referred to as swimlanes and phases, according to the particular classifications or categories represented by the swimlanes and phases, such as who or what is working with a particular subset of the process, for example. Considerations in laying out shapes in a CFF may include balancing when the shapes in the CFF should be subordinate to the size and position of the regions within the CFF and when the regions of the CFF should conform to the shapes inside it, maintaining the relative position and ordering of the regions in the CFF, and allowing the regions within the CFF to change size or position to accommodate shape layout without changing in a significant and unexpected way.

Because users of CFFs are often particularly sensitive to changes in the size and positioning of swimlanes and phases within the diagram, embodiments providing layout correction to lists of regions will be described in the context of CFFs. It should be understood, however, that the concepts presented herein with respect to correcting diagram layouts that include lists of regions are not limited to use with a CFF. Rather, any diagram having multiple adjacent regions, or lists of regions, may be manipulated in the manner described below.

Looking at FIG. 14A, the list of regions 1400 includes three regions, 1404, 1406, and 1408, which are represented in the CFF as horizontal swimlanes 1-3. In this example, each region or swimlane includes a heading area 1410 where the swimlanes are designated with a heading, which in this example includes "1," "2," and "3." Moreover, each region includes a margin 1412 around the interior perimeter of the region. The heading areas 1410 and margins 1412 have been designated in FIG. 14A with hatching for illustration purposes to clearly depict the areas of the list of regions 1400 in which shapes A-F are not to be placed. It should again be noted that other embodiments may allow shapes to be placed in a heading area 1410 or margin 1412, but provide other constraints with respect to these areas. The concepts presented here allow for any number and type of constraints to be applied with respect to the list of regions 1400.

Without the constraints discussed above that are specific to the list of regions 1400, a layout correction to the list of regions 1400 might result in shape D being placed closer to shape C, which could unexpectedly reduce the size of region 1404 and/or expand the size of region 1406. Shape F might normally be placed close to shape E, but this could cause region 1408 to expand or move and otherwise interfere with regions 1406 and 1404. Instead, as seen in the corrected list of regions 1402 shown in FIG. 14B, the techniques for region correction described herein provide for the spacing and alignment of shapes A-F, while minimizing the changes made to regions 1404, 1406, and 1408. First, the results of the layout correction utilizing the concepts disclosed herein will be discussed with respect to FIG. 14B, then the manner in which the layout correction engine performs the layout corrections according to various embodiments will be discussed with respect to the flow diagram of FIG. 15.

Figure 14B:
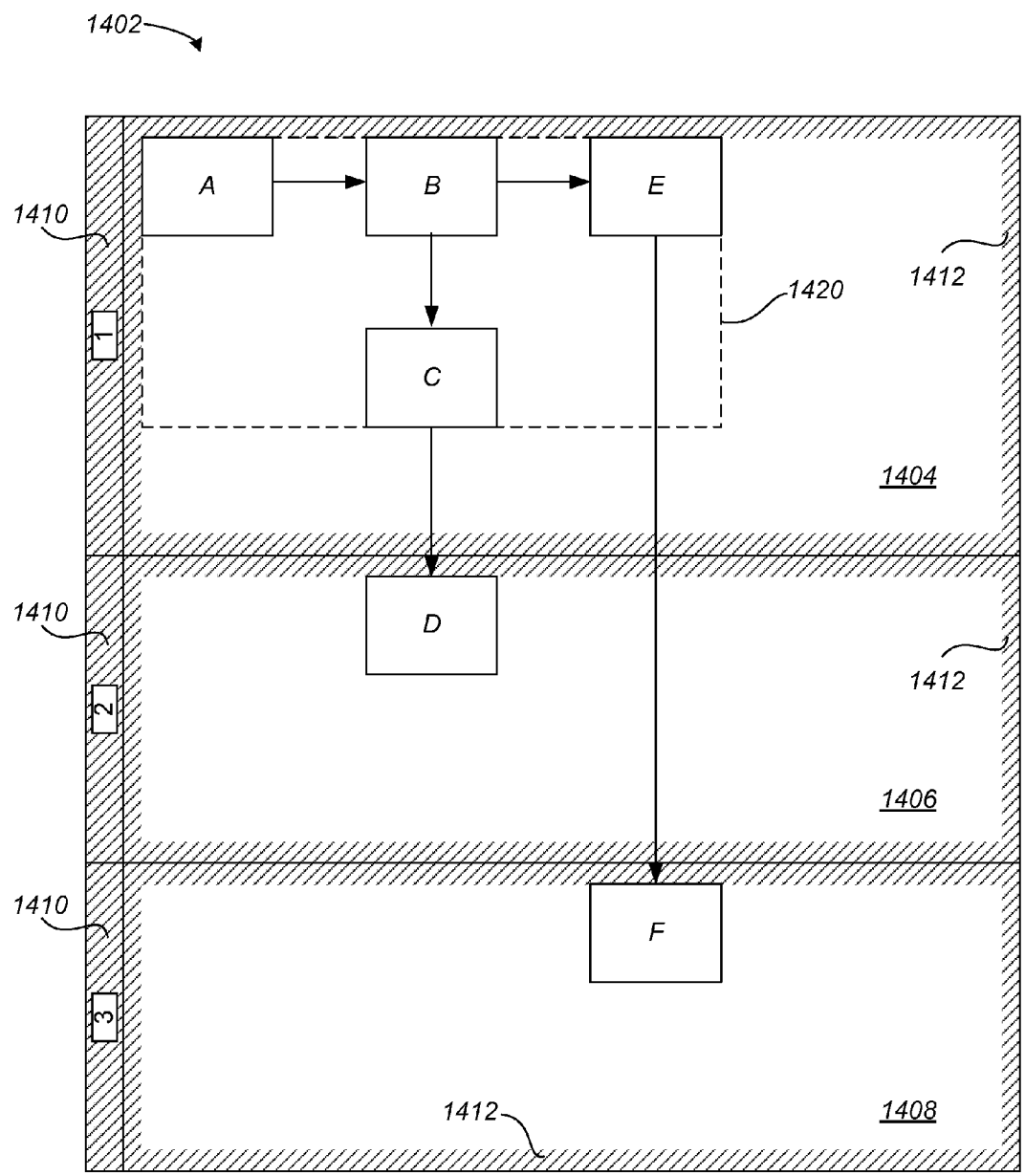

So, looking at FIG. 14B, after performing layout correction to the list of regions 1400 of FIG. 14A, the layout correction engine has constrained shapes D and F to move no closer than allowed by the top boundaries of regions 1406 and 1408, respectively, taking into consideration the margins 1412 and heading areas 1410. Moreover, rather than modifying the regions 1404, 1406, and 1408 to move the bottom boundaries upward to compress the spaces within the regions, the overall heights of the regions have been maintained. As previously mentioned, maintaining the dimensions of swimlanes within a CFF, particularly preventing the compression of swimlanes, can be especially desirable to users. So, rather than move the bottom border of the region 1404 closer to shape C, the height of the region 1404 is maintained. Similarly, the heights of regions 1406 and 1408 are also maintained in the corrected list of regions 1402.

Generally, shape layout within lists of regions is accomplished by predicting the ideal results and using those results as constraints on the actual shape placement in order to provide a desired corrected layout while minimizing the changes made to the regions. To do this, the layout correction engine first analyzes the subsets of shapes in the placement tree 500 for each region, which are herein referred to as segments. For example, there are three segments within the list of regions 1400. The first segment includes shapes A, B, C, and E. The second segment includes shape D and the third segment includes shape F. The spacing considerations of each region are then considered according to the desired layout of the corresponding segments, taking into account constraints such as margins and headings. These layout predictions are then aggregated across the list of regions and used to constrain shape positions when performing the corrected layout.

Figure 15:
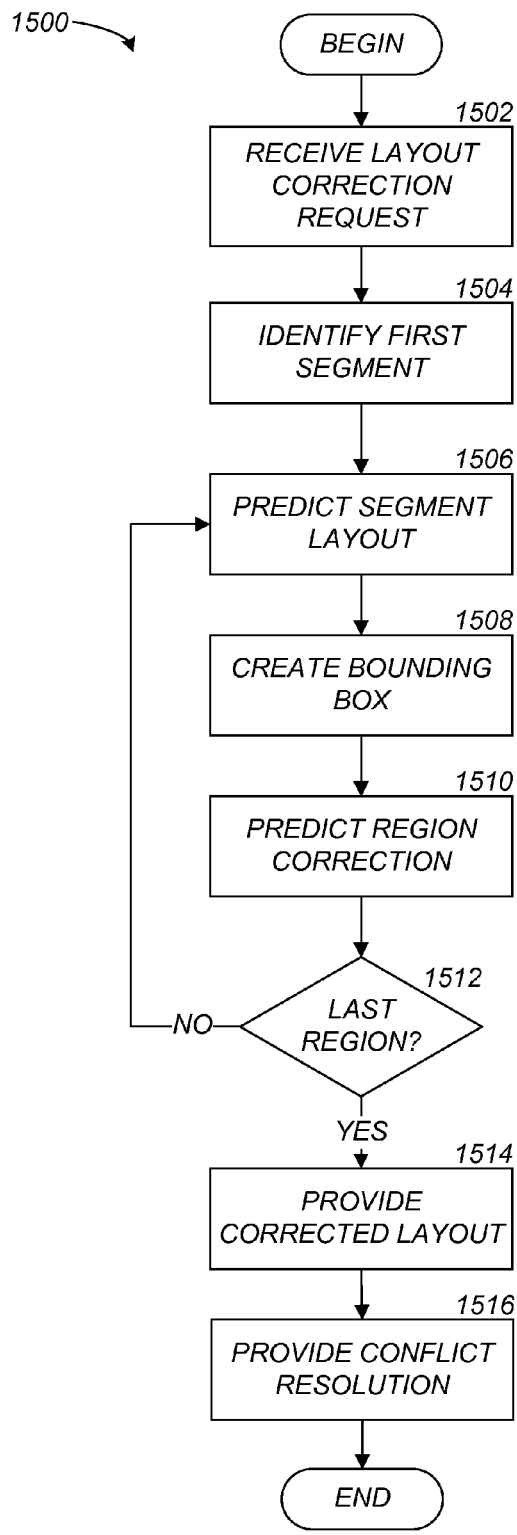
FIG. 15 is a flow diagram showing an illustrative process for correcting the positions of shapes in a diagram having a list of regions according to various embodiments presented herein.

Referring now to FIG. 15, additional details will be provided regarding the embodiments presented herein for correcting a layout in a diagram that includes a list of regions. In particular, FIG. 15 shows a flow diagram illustrating aspects of the operation of the layout correction engine in performing layout corrections with respect to a list of regions according to the disclosure provided herein. The routine 1500 begins at operation 1502, where the layout correction engine receives a layout correction request. As an illustrative example, the creator of the list of regions 1400 shown in FIG. 14A may have input a selection to align and space the shapes within the CFF being created.

At operation 1504, the layout correction engine identifies the first segment as including shapes A, B, C, and E since those shapes are members of the first swimlane, or region 1404. The routine 1500 continues from operation 1504 to operation 1506, where the layout correction engine determines the desired layout of the shapes of the first segment, without accounting for the constraints provided by any of the regions 1404, 1406, or 1408. The predicted layout of the segment shapes may be determined in a manner as described above with respect to the various embodiments, utilizing placement and dependency trees and layout rules. In this example, the shapes A, B, C, and E are to be evenly spaced from one another.

From operation 1506, the routine 1500 continues to operation 1508, where the layout correction engine creates a bounding box 1420 that encloses all of the shapes within the first segment. As seen in FIG. 14B, according to one embodiment, the bounding box 1420 is a rectangle, or any other shape, that occupies an amount of space occupied by the desired segment layout. The bounding box 1420 is used by the layout correction engine in determining the spacing requirements of the regions 1404. In other words, the bounding box 1420 can be viewed as a box that replaces the shapes within a segment for the purposes of determining region dimensions. Although the bounding box 1420 is shown with broken lines in FIG. 14B for illustrative purposes, it should be appreciated that according to various aspects of the disclosure, the bounding box 1420 is a conceptual element that defines the outer dimensions of the groups of shapes within a region and is not a visible shape that is rendered on the diagram.

In utilizing the bounding box 1420 concept, embodiments described herein improve the accuracy of the final layout.

Using the layout concepts and capabilities described above, each segment can be separately laid out conceptually to create an estimation of the desired layout for that segment of shapes, which may be represented by the bounding box 1420. The layout correction engine may then create and utilize the bounding box 1420 for each segment to predict the final diagram layout and correct any broader conflicts prior to placing the shapes of the diagram. In this manner, the optimal layouts of the local, segment shapes are preserved while laying out the entire diagram.

Once the bounding box 1420 is created at operation 1508, the routine 1500 continues to operation 1510, where any corrections to the region are predicted based on the constraints of the region and the size and location of the bounding box 1420. Looking at the example shown in FIGS. 14A and 14B, the bounding box 1420 is positioned against the top margin 1412 of region 1404, leaving a significant amount of space between the lower side of shape C and the lower margin of region 1404. However, rather than compressing the region 1404 to remove the excess space between shape C and the lower border of region 1404, the layout correction engine does not alter the dimensions of the region 1404. In this embodiment, the layout rules instruct the layout correction engine to maintain the dimensions of regions of a list of regions, when possible. It should be noted that in addition to choosing not to remove the excess space between the lower side of shape C and the lower margin of region 1404 by compressing the region 1404, the layout correction engine positions shapes D and F at the upper limit of their respective regions according to the margins 1412, without attempting to space shapes D and F closer to C and E, respectively.

Accordingly, for a list of regions, the layout correction engine may calculate the minimum additional spacing around the bounding box 1420 along an axis aligned with a flow direction of the list of regions, accounting for the margins 1412 of the regions, headings 1410 of the regions, spacing between shapes in each segment and shapes outside of the segment, and existing excess spacing in the regions along the axis of the list's flow direction. For a given segment, this analysis predicts shape positions and region boundary positions. According to various embodiments, if the predicted location of any of the region's boundaries would make the region smaller in that direction compared to the location before the layout correction, then the original position is to be used. Doing so prevents substantial compression or resizing of regions that may be contrary to a user's intent.

The routine 1500 continues from operation 1510 to operation 1512, where the layout correction engine determines whether the current region being analyzed for layout corrections is the last region in the list of regions. If not, then the routine 1500 returns to operation 1506 and the layout correction engine predicts the corrected layout of the next segment and corresponding region along the flow direction of the diagram as described above. However, if the layout correction engine determines at operation 1512 that the current region is the last region in the list of regions, then the routine proceeds to operation 1514.

Figure 16A:
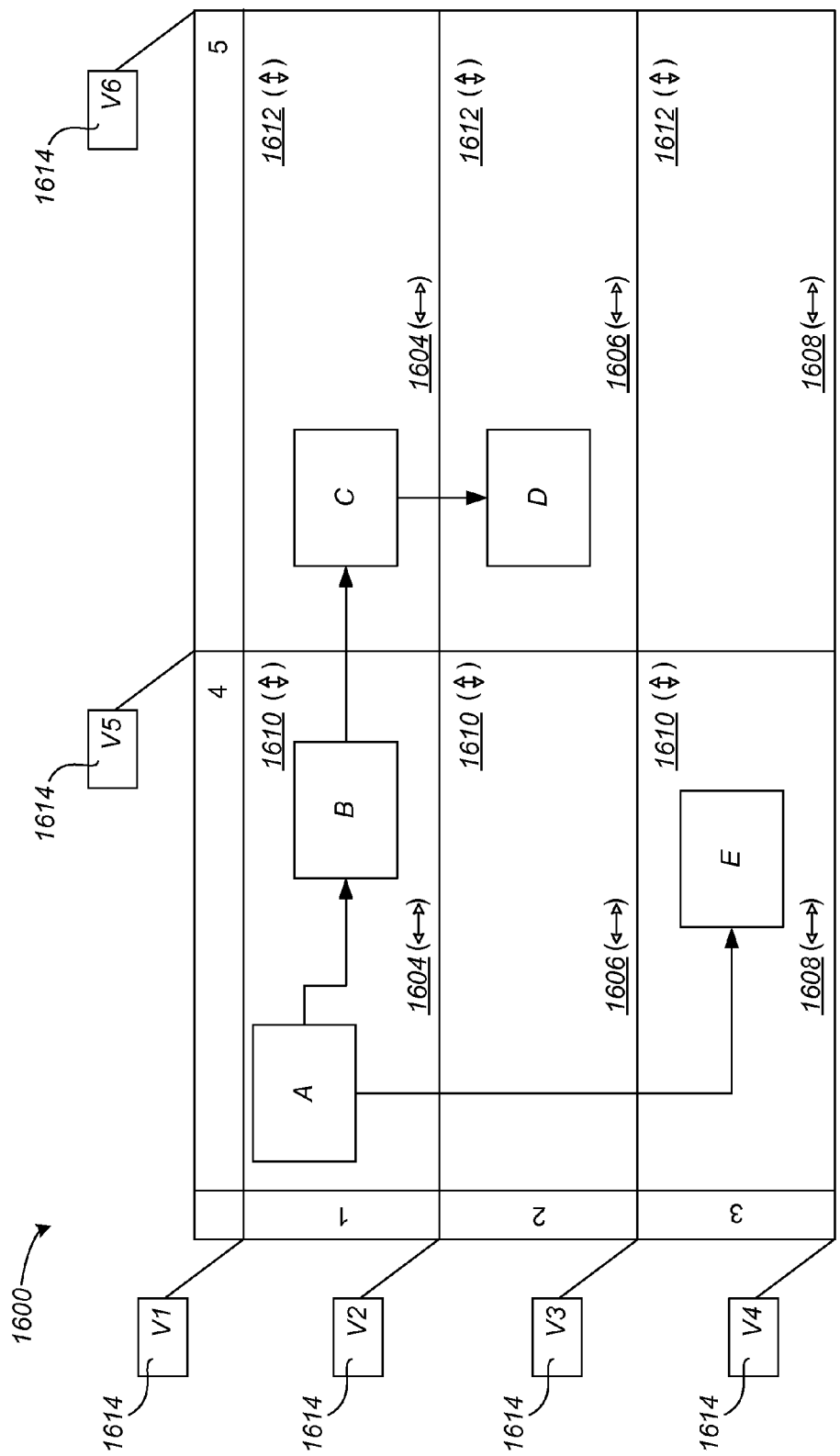
FIGS. 16A and 16B are illustrative diagrams showing a diagram layout having overlapping lists of regions before rotation correction procedures have been performed and after rotation correction procedures have been performed, respectively, according to various embodiments presented herein.

It should be understood that the list of regions may include overlapping lists of regions, as shown in FIG. 16A. Looking briefly at FIG. 16A, the illustrative CFF includes three horizontal swimlanes 1-3, which correspond to a first list of regions that includes regions 1604, 1606, and 1608. A second list of regions overlaps the first list and includes phases 4 and 5, which corresponds to regions 1610 and 1612. According to various embodiments, in a diagram that includes overlapping lists of regions or a grid of regions, the layout correction engine proceeds from the last region in the first list to the first region in the second list when performing the layout predictions and corrected layout. For example, using the CFF shown in FIG. 16A, the layout correction engine may perform the analysis in order from swimlane 1 down to swimlane 3, followed by phase 4 and phase 5.

Returning to FIG. 15, at operation 1514, the layout correction engine positions the shapes and region borders in the corrected positions before applying conflict resolution rules at operation 1516. The various shapes and regions are laid out in the same order that they were analyzed, which corresponds to the dependency tree 600 created as previously described. For example, starting at the root shape in the dependency tree 600, shapes in the first region or segment are placed, then boundary positions of the regions are set, then shapes in the next region are placed, and so forth until all segments of the tree have been addressed. When resolving conflicts, it should be appreciated that the conflict resolution rules may include pre-programmed or user-defined rules that are specific to the characteristics of the regions, list of regions, or type of diagram. The routine 1500 ends after the corrected diagram has been rendered and all conflicts resolved.

Figure 16B:
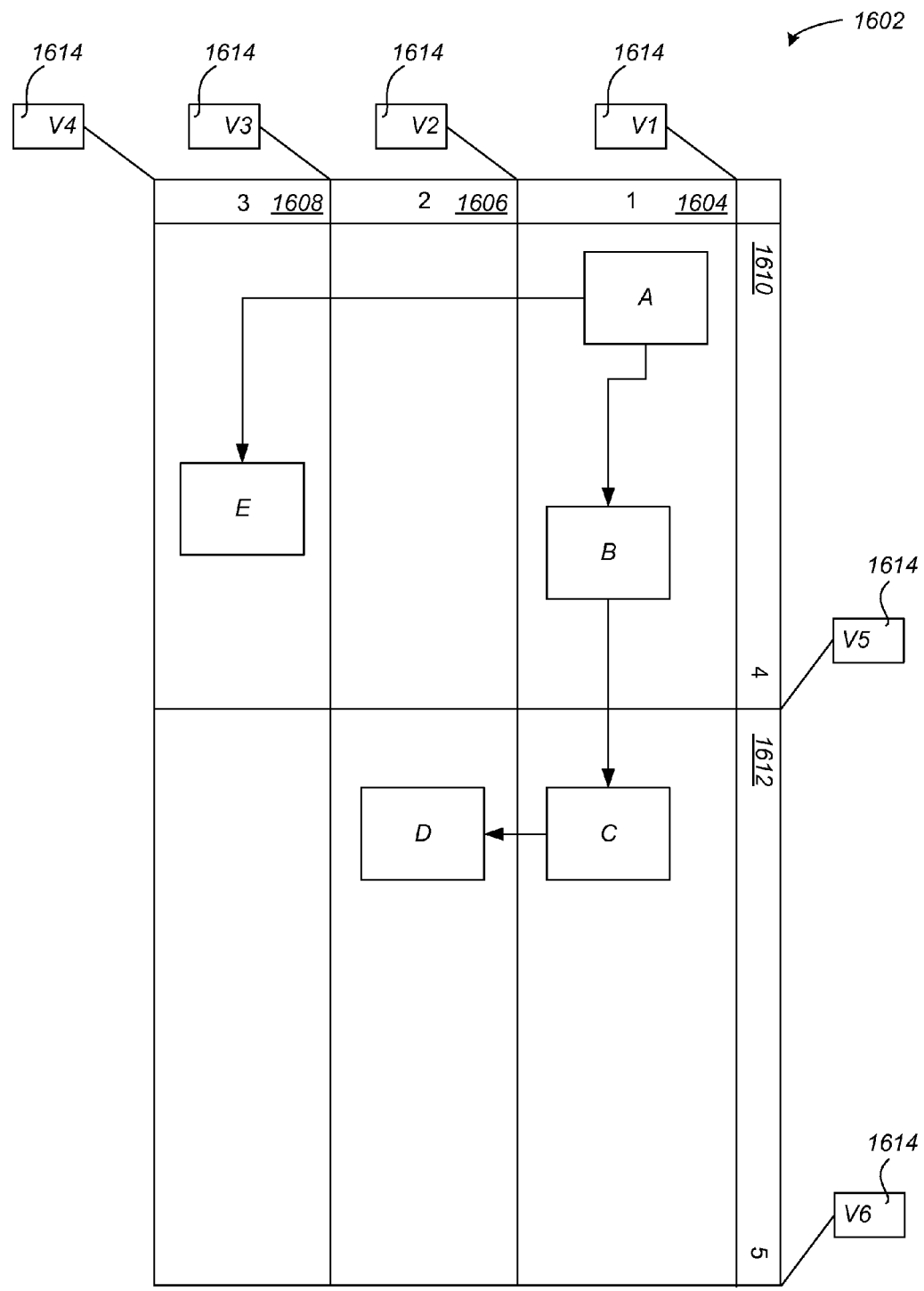

Turning now to FIGS. 16A and 16B, another embodiment of the disclosure will be described with respect to rotating or flipping a diagram that includes a list of regions or regions that provide specific constraints on the member shapes within. The rotation and flipping of a diagram having connected shapes that are not constrained by one or more regions was described above with respect to FIGS. 3A-3C. For those situations, the placement tree 500 and dependency tree 600 described above provide the layout correction engine with a virtual roadmap for providing the requested layout correction action.

However, when the diagram includes one or more regions that provide constraints on the positioning of the member shapes, then the layout correction engine may have difficulty, without the concepts discussed below, in building acceptable trees that will result in the rotation or flipping of a CFF or other list of regions in a manner that minimizes any changes to the regions within the diagram. Accordingly, to guide the size and position of the regions and shapes, virtual nodes are established at the corners of the regions and are integrated into the placement and dependency tree construction. The requested rotation or flip action may then be performed with the transformed virtual nodes indicating the desired positions of the corners of each region. As will become clear from the example described below with respect to FIGS. 16A and 16B, the regions within a list of regions may require resizing during rotation actions when the ratio of the member shapes' widths to heights is not 1:1.

Looking at FIG. 16A, an overlapping list of regions 1600, or grid of regions, is shown and will be described in the context of a rotation request received by the layout correction engine from a user. As briefly described above, the illustrative CFF or overlapping list of regions 1600 includes three swimlanes (1-3) and two phases (4 and 5). Each swimlane and each phase represents a single region. Consequently, the CFF can be viewed as having two overlapping lists of regions, the first corresponding to horizontally-oriented regions 1604, 1606, and 1608, while the second corresponds to vertically-oriented regions 1610 and 1612. The small arrows in parenthesis next to the region reference numbers are used to illustrate that the region extends beyond the adjacent border such that it spans the entire CFF from top to bottom or side to side, where applicable.

According to one embodiment of this disclosure, in order to maintain the sizing and positioning of the regions during rotation, the layout correction engine creates the virtual nodes

1614, which are located at the corners of the regions along at least two sides of the diagram. These virtual nodes 1614 have been numbered V1-V6, starting at the upper left corner of the first region 1604, down the vertical side of the grid through the first list of regions 1604, 1606, and 1608, and then across the horizontal side of the grid through the second list of regions 1610 and 1612. It should be appreciated that other numbering conventions are contemplated and that this disclosure is not limited to the specific locations and number of virtual nodes utilized by the layout correction engine. For example, according to other embodiments, the numbering convention for the virtual nodes 1614 could begin at any other corner of the overlapping list of regions 1600 and traverse either side of the grid, as well as the top or bottom sides of the grid.

FIG. 16B shows the rotated overlapping list of regions 1602 after repositioning and resizing of the shapes and regions has been accomplished. As seen in this example, the positions of shapes A-E were rotated with the regions such that the longer sides of the shapes maintained the top and bottom positions from a viewer's perspective. In doing so, the width of swimlane 1, or region 1604 was increased slightly to accommodate the new orientation of the shapes A and B. It should be noted that in this example, the width of swimlane 1 was only increased an amount that allows shapes A and B to fit within the margins (not shown) of the region 1604 and not an amount that equalizes the space on either side of shape C. Although this disclosure is not limited to minimizing changes to the regions in a list of regions, it is often the desired outcome when manipulating CFFs. It should also be understood that in addition to rotating the overlapping list of regions 1600, the layout correction engine may additionally align and space the shapes A-E within the diagram once rotated, depending on the request initiated by the user.

Figure 17B:
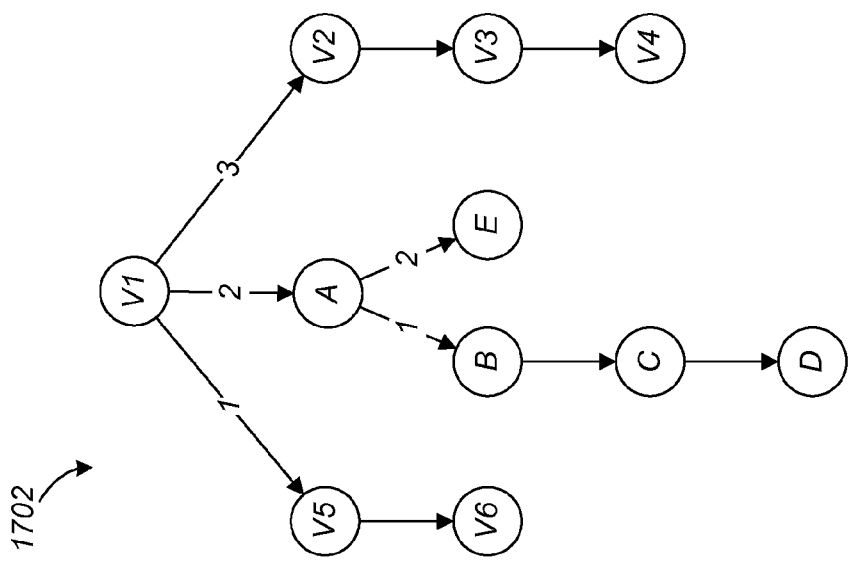
FIGS. 17A and 17B are illustrative examples of a placement tree, with and without virtual nodes, respectively, corresponding to the diagrams shown in FIGS. 16A and 16B according to various embodiments presented herein.
Figure 17A:
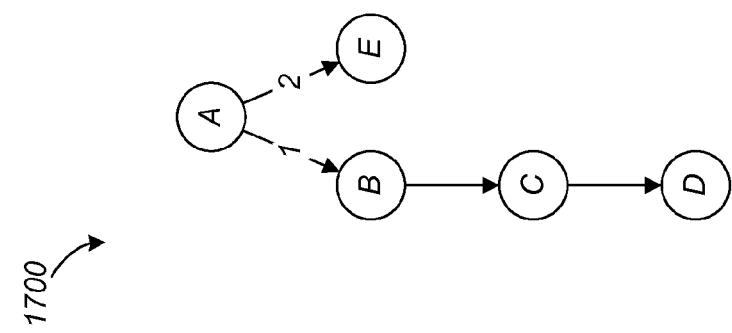

FIG. 17A illustrates a potential placement tree 1700 for the shapes A-E without considering the corresponding regions of the diagram. Rotation of the overlapping list of regions 1600 starting from the potential placement tree 1700 might not place the shapes A-E in the desired positions within the regions since the layout correction engine does not yet have the information that would result in proper placement and dimensioning of the regions. FIG. 17B shows one implementation of a placement tree 1702 that utilizes the virtual nodes 1614 that represent corners of the regions of the diagram. The shapes are positioned starting with shape A from the first virtual node V1. The virtual nodes V2 and V5 are also spaced from V1, with the remaining virtual nodes 1614 spaced accordingly. The virtual nodes 1614 now provide a definition of the region boundaries. It should again be pointed out that after placement of the rotated layout, the width of swimlane 1 was minimally increased to avoid a conflict between the shapes A and B and margins of the region 1604.

Figure 18:
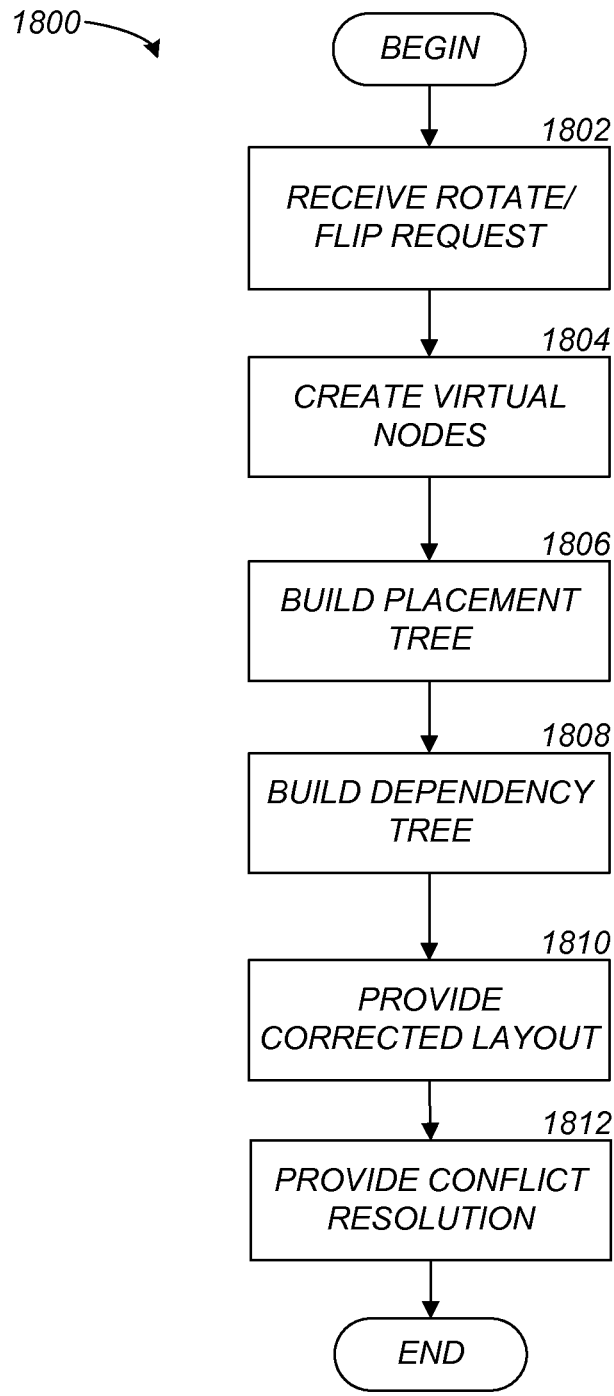
FIG. 18 is a flow diagram showing an illustrative process for rotating or flipping the positions of shapes in a diagram according to various embodiments presented herein.

Turning to FIG. 18, an illustrative routine 1800 for processing a rotate or flip request with respect to a list of regions or overlapping list of regions will be described. The routine 1800 begins at operation 1802, where the layout correction engine receives the rotate or flip request from the user via an input device. At operation 1804, the layout correction engine creates the virtual nodes 1614 corresponding to corners of the regions within the overlapping list of regions.

From operation 1804, the routine 1800 continues to operation 1806, where the placement tree is built. After building the corresponding dependency tree at operation 1808, the layout correction engine lays out the rotated or flipped overlapping list of regions according to the dependency tree and applicable layout rules at operation 1810. The routine 1800 continues to operation 1812, where the layout correction engine resolves any conflicts using the conflict resolution rules, and the routine 1800 ends.

Figure 19A:
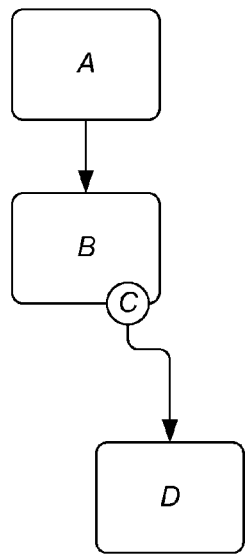
FIGS. 19A and 19B are illustrative diagrams showing a diagram layout having overlapping shapes before spacing and alignment correction procedures have been performed and after spacing and alignment correction procedures have been performed, respectively, according to various embodiments presented herein.

As mentioned briefly above, there are scenarios in which a diagram user would like to make adjustments to the shapes within a diagram layout, but the position of one or more shapes within the diagram is constrained due the type of connection between shapes. More specifically, the diagramming application may allow a user to directly glue a shape to a connection point on another shape without the use of a connecting line. One example of this type of connection is shown in FIG. 19A. The diagram 1900 includes shapes A-D. Shape A is connected to shape B via a traditional connector line. Similarly, shape C is connected to shape D via a connector line. However, shape C has been directly attached to shape B, without an intervening connector line, in a manner that allows shape C to overlap a portion of shape B.

According to some embodiments discussed above, the layout correction engine would avoid overlapping shapes when placing them. However, in some situations, shape overlap is desirable. One illustrative implementation includes business process modeling notation ("BPMN") diagrams. Creators of BPMN and other diagrams can glue shapes to other shapes so that the overlapping shape follows the overlapped shape if the latter is moved. It would be undesirable in these situations for the layout correction engine to pull an overlapping shape from the overlapped shape to which it is glued when making layout corrections.

The concepts presented herein allow for layout corrections while maintaining the positioning of overlapping shapes with respect to one another. To do so, the layout correction engine classifies and prioritizes the connections in a diagram to determine the appropriate parent-child relationships and the order in which a given shape's children are processed. According to various embodiments, if a connection exists between shapes via a connecting line, then the connection is classified as a 1-D connection since the connection is accomplished using a one dimensional line. If a connection exists between shapes without the use of a connecting line, it is classified as a 2-D connection since the connection is accomplished directly between a pair of two dimensional shapes. As will be described below, these connections are further prioritized, which aids the layout correction engine in determining which connections take precedence when performing layout corrections such as spacing.

First, however, FIGS. 19A-20B will be described to illustrate the simplified concept of alignment and spacing involving glued overlapping shapes. Looking at FIG. 19A, the diagram 1900 includes shapes A-D with 1-D connections from shapes A to B and C to D, and a 2-D connection between shapes B and C since shape C is glued to location on shape B. According to one embodiment, when performing a spacing and alignment correction, the layout correction engine will render the corrected diagram 1902 shown in FIG. 19B. As seen in the corrected diagram 1902, shape B is aligned with shape A, shape C maintains its position on shape B, and shape D is aligned with and spaced from shape C. Diagrams 1900 and 1902 provide a simplified example since each shape only has one parent and/or one child, so the connection prioritization described below would not be applicable.

Figure 19B:
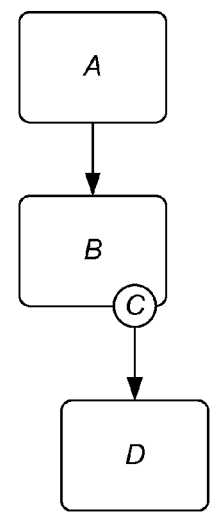

It should be noted that for glued overlapping shapes, such as the 2-D connection between shapes B and C, the layout correction engine maintains the positioning of the overlapping shape on the overlapped shape to which it is glued. For example, as seen in FIGS. 19A and 19B, the positioning of shape C on shape B does not change after layout corrections are made. However, as will be described below with respect to FIGS. 21A and 21B, if the overlapped shape is a region, the size of the region may still be altered to provide spacing correction even if the position of the shapes glued to the region remains constant.

As stated above, the layout correction engine prioritizes the connections after classifying them as 1-D or 2-D. According to various embodiments, before prioritization, each connection is further classified as major or minor. To determine whether a connection is major or minor, the overall flow direction of the diagram is first determined with respect to the shapes participating in the layout. One method for determining a flow direction is according to the dimensions of a bounding box surrounding the participating shapes. The process flows in a direction from the root shape of the diagram in the direction of the longest side of the bounding box. With respect to FIG. 19A, the flow direction is top to bottom from root shape A toward shape D. For a 1-D connection, if its displacement is along the diagram's overall flow direction, the connection between those shapes may be considered major. Otherwise, the 1-D connection is minor.

With respect to a 2-D connection, the overlapping shape may be considered the source shape that is glued to the overlapped shape, or target shape. A 2-D connection from a source shape to a target shape is considered major, while a 2-D connection from the target shape to the source shape is considered minor. According to one embodiment, when determining parent-child relationships and the order in which child shapes are processed, the following prioritization is used:

1) 2-D major connection
2) 1-D major connection
3) 1-D minor connection
4) 2-D minor connection Looking again at FIG. 19A, the connection from shape A to shape B is a 1-D major connection since it relates to a connection made via a connecting line in the direction of the flow of the diagram. The connection from shape B to shape C is a 2-D minor connection since the connection is between two shapes without the use of a connecting line, and because the connection is from a target shape (shape B) to a source shape (shape C). Finally, the connection from shape C to shape D is another 1-D major connection as it is via a connecting line and is in the direction of the flow of the diagram.

Figure 20A:
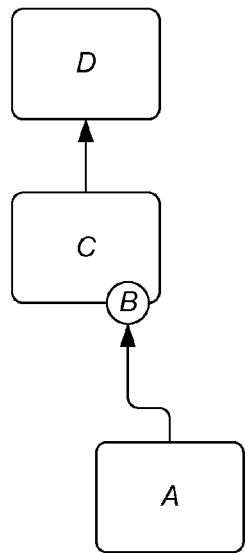
FIGS. 20A and 20B are illustrative diagrams showing a diagram layout similar to, but having an opposite flow direction as, the diagrams in FIGS. 19A and 19B, before spacing and alignment correction procedures have been performed and after spacing and alignment correction procedures have been performed, respectively, according to various embodiments presented herein.
Figure 20B:
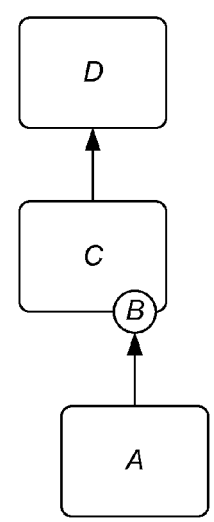

FIGS. 20A and 20B are similar to FIGS. 19A and 19B, respectively, but the diagram flows in the opposite direction. In this direction, the connection from shape A to shape B is a 1-D major connection, the connection from shape B to shape C is a 2-D major connection, and the connection from shape C to shape D is a 1-D major connection. As seen in FIG. 20B, a layout correction of diagram 2000 results in a corrected diagram 2002 that is similar to that described above with respect to FIG. 19B. Shape B aligns and spaces from shape A, but brings shape C along with it so that shapes B and C maintain the same relative positioning. Shape D aligns and spaces from shape C.

Turning to FIGS. 21A and 21B, one embodiment will be described in which a diagram 2100 includes shapes within and glued to a region A. In diagram 2100, shape B is glued to an upper boundary of region A and is connected to shape C within region A. Shape C is connected to shape D, which is glued to a lower boundary of region A. In classifying these connections, the connection from shape A to shape B is a 2-D minor connection, the connection from shape B to shape C is a 1-D major connection, the connection from shape C to shape D is a 1-D major connection, and the connection from shape A to shape D is a 2-D minor connection.

Utilizing the concepts described herein, the layout correction engine might adjust the diagram 2100 using these connection classifications and prioritization to arrive at the corrected diagram 2102 shown in FIG. 21B. In the corrected diagram 2102, the shapes B and D have maintained their glued positions on region A. However, shape C has aligned with shape B, and the lower boundary of region A has moved upward to space shape D from shape C a distance that is approximate to the distance between shapes B and C.

To understand how the layout correction engine arrived at the corrected layout shown in diagram 2102, placement trees 2200 and 2202 shown in FIGS. 22A and 22B will now be described. Placement tree 2200 represents a possible placement tree that could be created by the layout correction engine if connection classification and prioritization is not performed. According to this implementation, shapes B and D are resolved to each have a single parent, shape A. Shape B is the parent of shape C. Using this placement tree 2200, it is possible that the layout correction engine would build a dependency tree that would result in the lower boundary of region A maintaining the original position so that shape D is not spaced from shape C, since there is no association between shapes C and D according to the placement tree 2200.

However, utilizing the connection classification and prioritization implementation described above, the fact that shape D has two potential parents (shape A and shape C) would be resolved so that shape D depends from shape C as its parent as shown in the placement tree 2202 shown in FIG. 22B. This is due to the prioritization rules described above. The connection from shape A to shape D is a 2-D minor connection, which is lower in priority than the 1-D major connection from shape C to shape D. As a result, the layout correction engine may determine that shape D should depend from shape C and build the resulting placement tree 2202. The broken line between shape A and shape B in the placement tree 2202 indicates that this is a minor connection, while major connections are shown with a solid line. The placement tree 2202 ensures that shape D is considered a child of shape C and is therefore spaced from shape C even though shape D cannot be aligned with shape C due to the glued connection to the boundary of region A.

It should be appreciated that the present disclosure is not limited to the precise number and types of classifications and prioritizations described herein. Rather the examples given within this disclosure are to be construed as examples of a classification and prioritization technique that may be used by the layout correction engine to allow for the use of the layout correction techniques described above to provide a desirable result that is intended by the user.

Figure 23:
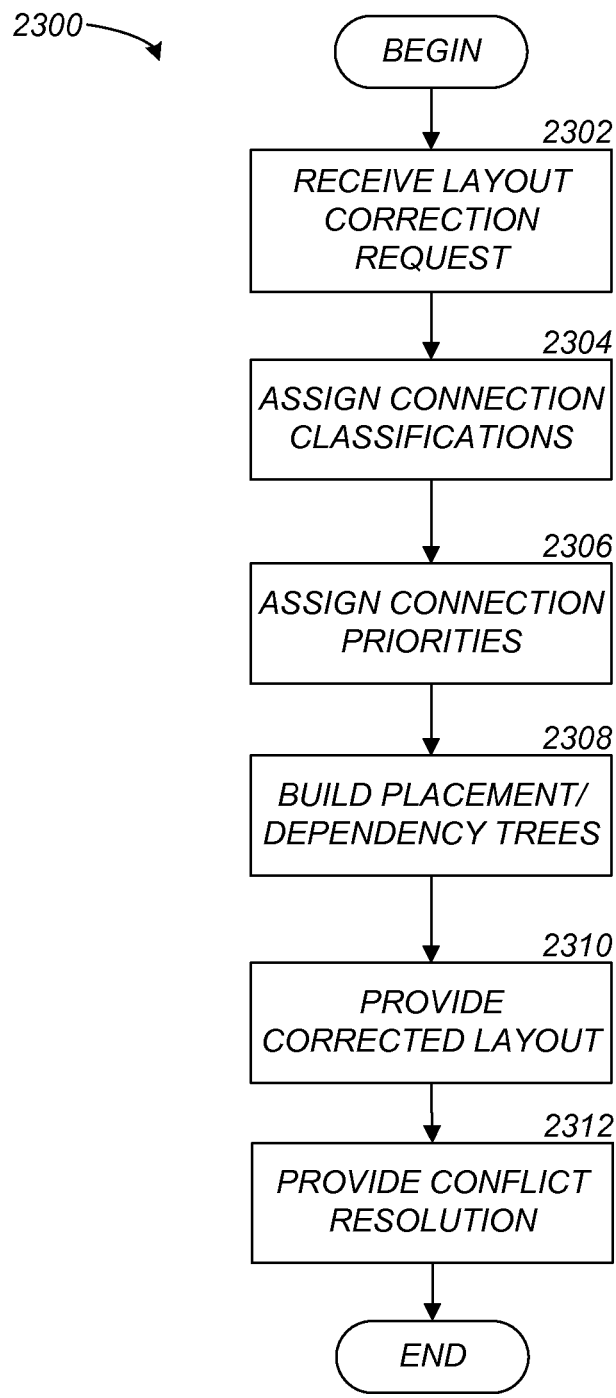
FIG. 23 is a flow diagram showing an illustrative process for correcting the positions of shapes in a diagram having shapes or regions glued directly to other shapes or regions according to various embodiments presented herein.

Turning now to FIG. 23, an illustrative routine 2300 will be described for correcting a layout of a diagram having shapes that are directly connected to other shapes without the use of a connecting line. The routine 2300 begins at operation 2302, where the layout correction engine receives a layout correction request from the user. At operation 2304, the layout correction engine assigns connection classifications to the shapes within the diagram according to the flow direction of the diagram. According to various embodiments, these classifications may include 1-D or 2-D and major or minor connection classifications. From operation 2304, the routine 2300 continues to operation 2306, where the layout correction engine assigns priorities to the connections according to the determined connection classifications and predetermined prioritization rules.

The routine 2300 continues from operation 2306 to operation 2308, where the layout correction engine builds the appropriate placement and dependency trees, taking into account the connection priorities established at operation 2306. The routine 2300 continues to operation 2310, where the corrected layout is provided according to the dependency tree. Any conflicts are resolved according to conflict resolution rules at operation 2312, and the routine 2300 ends.

Figure 24:
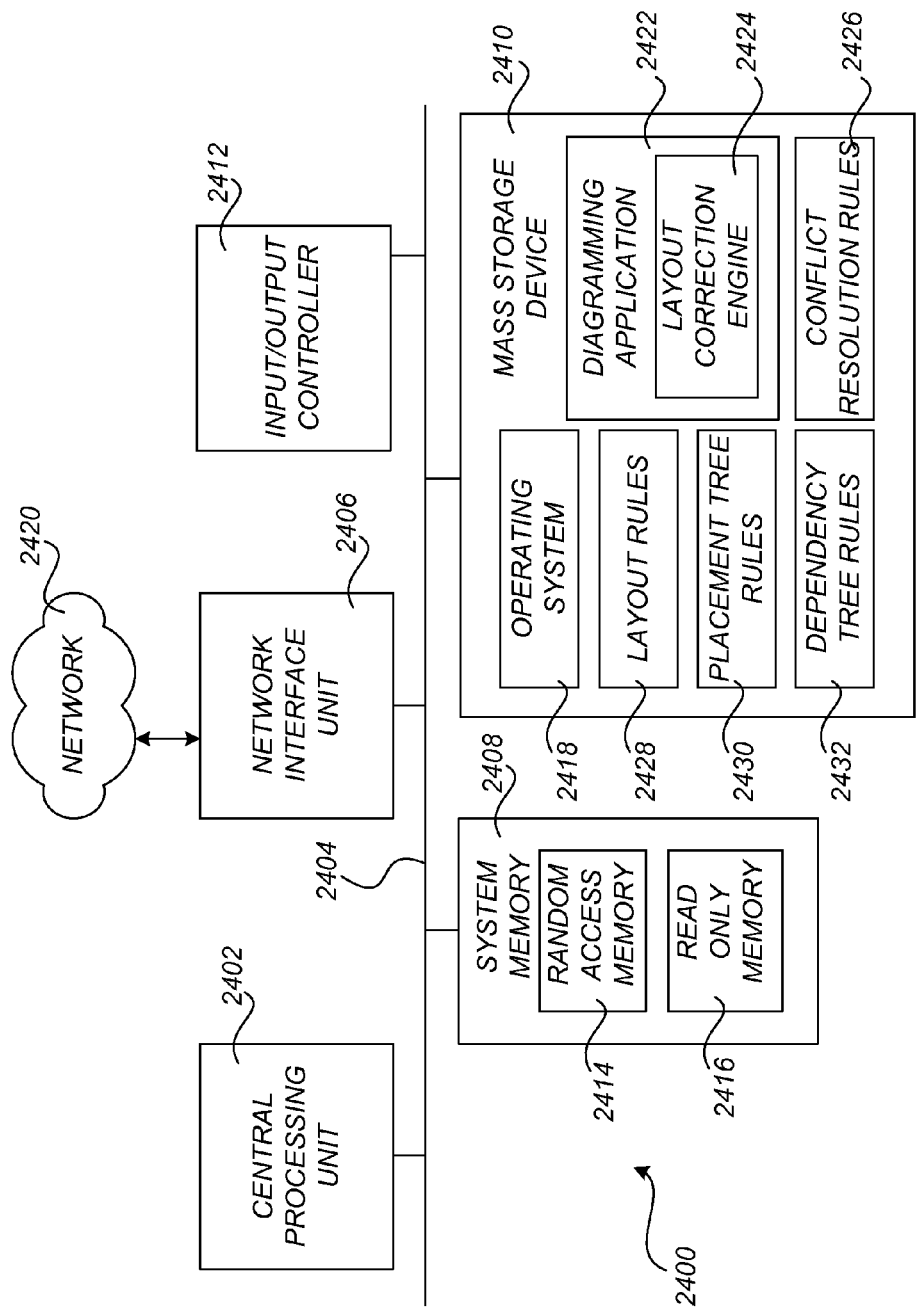
FIG. 24 is a computer architecture diagram showing an illustrative computer hardware and software architecture for a computing system capable of implementing aspects of the embodiments presented herein.

FIG. 24 shows an illustrative computer architecture for a computer 2400 capable of executing the software components described herein for correcting the positions of shapes in a diagram in the manner presented above. The computer architecture shown in FIG. 24 illustrates a conventional desktop, laptop, or server computer and may be utilized to execute any aspects of the software components presented herein.

The computer architecture shown in FIG. 24 includes a central processing unit 2402 ("CPU"), a system memory 2408, including a random access memory 2414 ("RAM") and a read-only memory ("ROM") 2416, and a system bus 2404 that couples the memory to the CPU 2402. A basic input/output system containing the basic routines that help to transfer information between elements within the computer 2400, such as during startup, is stored in the ROM 2416. The computer 2400 further includes a mass storage device 2410 for storing an operating system 2418, application programs, and other program modules, which are described in greater detail herein.

The mass storage device 2410 is connected to the CPU 2402 through a mass storage controller (not shown) connected to the bus 2404. The mass storage device 2410 and its associated computer-readable media provide non-volatile storage for the computer 2400. Although the description of computer-readable media contained herein refers to a mass storage device, such as a hard disk or CD-ROM drive, it should be appreciated by those skilled in the art that computer-readable media can be any available computer storage media that can be accessed by the computer 2400.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 2400.

According to various embodiments, the computer 2400 may operate in a networked environment using logical connections to remote computers through a network such as the network 2420. The computer 2400 may connect to the network 2420 through a network interface unit 2406 connected to the bus 2404. It should be appreciated that the network interface unit 2406 may also be utilized to connect to other types of networks and remote computer systems. The computer 2400 may also include an input/output controller 2412 for receiving and processing input from a number of other devices, including a keyboard, mouse, or electronic stylus (not shown in FIG. 24). Similarly, an input/output controller may provide output to a display screen, a printer, or other type of output device (also not shown in FIG. 24).

As mentioned briefly above, a number of program modules and data files may be stored in the mass storage device 2410 and RAM 2414 of the computer 2400, including an operating system 2418 suitable for controlling the operation of a networked desktop, laptop, or server computer. The mass storage device 2410 and RAM 2414 may also store one or more program modules. In particular, the mass storage device 2410 and the RAM 2414 may store a diagramming application 2422, the layout correction engine 2424, the conflict resolution rules 2426, the layout rules 2428, the placement tree rules 2430, and the dependency tree rules 2432, each of which was described in detail above. The mass storage device 2410 and the RAM 2414 may also store other types of program modules.

Based on the foregoing, it should be appreciated that technologies for correcting diagram layouts are provided herein. Utilizing the concepts disclosed above, a user will be able to enjoy multi-directional alignment and spacing of shapes in a diagram. The layout correction processes may occur automatically as the diagram is built or edited, through the selection of a single control, or through a minimal combination of controls, rather than requiring the user to manually nudge shapes around the diagram in an effort to clean up misalignments and uneven spacing. By repositioning shapes according to the current layout and offset between shapes, the embodiments provided herein can make minor corrections without destroying the general layout as created by the user. Specifically, using concepts described herein, region and shape correction involving complex constraints, such as those involving lists of regions and direct connection of shapes to other shapes and regions, may be provided in a manner that maintains the integrity of the diagram being adjusted to most closely satisfy the intent and desire of the user.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for correcting a diagram layout comprising a plurality of shapes positioned within a list of regions, the method comprising:
receiving a layout correction request;
in response to the layout correction request, for each region of the list of regions, wherein the list of regions comprises a plurality of containers that abut one another,
determining a corrected layout of a set of shapes without determining a region correction,
determining a minimum additional spacing around the corrected layout of the set of shapes within the region, and
determining corrected region boundaries according to the minimum additional spacing;
resolving an ambiguity when a plurality of parent shapes are associated with a shape of the plurality of shapes by using a placement tree rule to select one parent shape of the plurality of parent shapes so that each shape of the plurality of shapes has only one parent shape, the placement tree rule defining an order of processing for a branch of a dependency tree created to resolve the ambiguity; and
sequentially repositioning the set of shapes and region boundaries for each region of the list of regions according to the corrected layout and the corrected region boundaries by progressing through the dependency tree and repositioning the set of shapes and region boundaries for each region of the list of regions according to the placement tree rule.

2. The computer-implemented method of claim 1, wherein determining a corrected layout of a set of shapes without region correction for each region of the list of regions comprises:
- defining a segment for each region that comprises every shape within the region; and
- for each segment, determining a predicted layout of the shapes within the segment, ignoring any region constraints.

3. The computer-implemented method of claim 2, wherein determining a minimum additional spacing around the corrected layout of the set of shapes within the region comprises:
- defining a bounding box around the predicted layout of the shapes within the segment; and
- determining an amount of additional space needed around the bounding box such that the bounding box fits within the region according to any region constraints.

4. The computer-implemented method of claim 1, wherein the corrected region boundaries comprises a minimum of an original spacing between opposing region boundaries in a direction of flow of the list of regions.

5. The computer-implemented method of claim 1, wherein the list of regions comprises a plurality of swimlanes or phases of a cross functional flowchart (CFF).

6. The computer-implemented method of claim 1, further comprising resolving conflicts after repositioning the set of shapes and region boundaries according to at least one conflict resolution rule.

7. The computer-implemented method of claim 1, wherein the layout correction request comprises a request to align and space the plurality of shapes within the list of regions.

8. The computer-implemented method of claim 1, wherein the layout correction request comprises a request to rotate or flip the plurality of shapes and the list of regions.

9. An optical disk, a magnetic storage device, or a solid state storage device having computer executable instructions stored thereon which, when executed by a computer, cause the computer to:
- receive a layout correction request to alter a layout of a diagram comprising a plurality of shapes positioned within a list of regions, wherein the list of regions comprises a plurality of containers that abut one another;
- resolve an ambiguity when a plurality of parent shapes are associated with a shape of the plurality of shapes by using a placement tree rule to select one parent shape of the plurality of parent shapes so that each shape of the plurality of shapes has only one parent shape, wherein the placement tree rule defines an order of processing for a branch of a dependency tree created to resolve the ambiguity; and
- sequentially reposition the plurality of shapes in the diagram according at least one layout rule corresponding to the layout correction request by progressing through the dependency tree and repositioning the set of shapes and region boundaries for each region of the list of regions according to the placement tree rule.

10. The optical disk, the magnetic storage device, or the solid state storage device of claim 9, wherein the layout correction request comprises a request to rotate or flip the diagram.

11. The optical disk, the magnetic storage device, or the solid state storage device of claim 9, wherein the diagram comprises a grid of regions having a horizontally-oriented list of regions and an overlapping vertically-oriented list of regions.

12. The optical disk, the magnetic storage device, or the solid state storage device of claim 11, wherein the grid of regions comprises a CFF such that the horizontally-oriented list of regions comprises a plurality of swimlanes and the vertically-oriented list of regions comprises a plurality of phases.

13. The optical disk, the magnetic storage device, or the solid state storage device of claim 9, wherein the layout correction request comprises a request to rotate the diagram 90 degrees, and wherein the computer executable instructions, when executed by a computer, further cause the computer to rotate each of the plurality of shapes in place such that an orientation of each of the plurality of shapes prior to diagram rotation is maintained after diagram rotation.

14. The optical disk, the magnetic storage device, or the solid state storage device of claim 13, wherein the computer executable instructions, when executed by a computer, further cause the computer to:
- determine a minimum additional spacing around a corrected layout of a set of shapes within each region;
- determine corrected region boundaries for each region according to the minimum additional spacing; and
- sequentially reposition the region boundaries for each region of the list of regions according to the corrected region boundaries, wherein the corrected region boundaries comprises a minimum of an original spacing between opposing region boundaries in a direction of flow of the list of regions.

15. A computer, comprising:
- a processor; and
- a computer-readable storage medium in communication with the processor, the computer-readable storage medium having computer executable instructions stored thereon which, when executed by the processor, cause the processor to:
- receive a layout correction request to alter a layout of a plurality of shapes in a diagram, wherein a first shape of the plurality of shapes is glued directly to a second shape of the plurality of shapes without a connecting line;
- assign a connection classification to each connection between the plurality of shapes by assigning a first classification to a connection between two shapes connected via a connecting line and assigning a second classification to a connection between two shapes connected without a connecting line;
- designate the first classification as major if the connection is in a direction of flow of the diagram and to designate the first classification as minor if the connection is not in the direction of flow of the diagram, and to designate the second classification as major if the connection is in a direction of an overlapping shape to an overlapped shape and to designate the second classification as minor if the connection is in a direction of the overlapped shape to the overlapping shape;
- assign a connection priority according each connection classification;
- create a dependency tree that defines parent and child relationships between the plurality of shapes and associations between the plurality of shapes according to physical positions of the plurality of shapes in the diagram and to the connection priority assigned to each connection; and sequentially reposition at least a subset of the plurality of shapes in the diagram according to the dependency tree and at least one layout rule corresponding to the layout correction request.

16. The computer of claim 15, wherein the second shape comprises a region and wherein the first shape is glued directly to a position on a boundary of the region and wherein the at least one layout rule allows the boundary of the region to be moved such that a size of the region may be modified, but prevents the first shape from moving from the position where glued on the boundary of the region.

17. The computer of claim 15, wherein causing the computer to assign the connection priority according each connection classification comprises causing the processor to assign a highest priority to connections assigned with the second classification and designated as major.

* * * * *